US011270448B2

(12) United States Patent
Price et al.

(10) Patent No.: US 11,270,448 B2
(45) Date of Patent: Mar. 8, 2022

(54) USING MACHINE LEARNING TO SELECTIVELY OVERLAY IMAGE CONTENT

(71) Applicant: MICROSOFT TECHNOLOGY LICENSING, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 16/696,607

(22) Filed: Nov. 26, 2019

(65) Prior Publication Data
US 2021/0158548 A1   May 27, 2021

(51) Int. Cl.
*G06T 7/33* (2017.01)
*G06T 7/593* (2017.01)
(Continued)

(52) U.S. Cl.
CPC ............. *G06T 7/33* (2017.01); *G06T 7/593* (2017.01); *H04N 13/133* (2018.05);
(Continued)

(58) Field of Classification Search
CPC . G06T 7/33; G06T 7/593; G06T 2207/10012; G06T 2207/10048; G06T 2207/20081; G06T 2207/20084; G06T 2207/20212; H04N 13/156; H04N 13/239; H04N 13/25; H04N 13/133; H04N 2013/0081
See application file for complete search history.

(56) References Cited

U.S. PATENT DOCUMENTS

| 5,325,449 | A  | 6/1994 | Burt et al. |
| 7,246,567 | B2 | 7/2007 | Shelton et al. |

(Continued)

FOREIGN PATENT DOCUMENTS

| CN | 106570852 A   | 4/2017 |
| CN | 109447936 A   | 3/2019 |
| WO | 2020103601 A1 | 5/2020 |

OTHER PUBLICATIONS

Berg, et al., "Generating Visible Spectrum Images from Thermal Infrared", In Conference on Computer Vision and Pattern Recognition Workshops (CVPRW), IEEE, Jun. 18, 2018, 10 Pages.
(Continued)

*Primary Examiner* — Brenda C Bernardi
(74) *Attorney, Agent, or Firm* — Workman Nydegger

(57) ABSTRACT

Modifications are performed to cause a style of an image to match a different style. A first image is accessed, where the first image has the first style. A second image is also accessed, where the second image has a second style. Subsequent to a deep neural network (DNN) learning these styles, a copy of the first image is fed as input to the DNN. The DNN modifies the first image copy by transitioning the first image copy from being of the first style to subsequently being of the second style. As a consequence, a modified style of the transitioned first image copy bilaterally matches the second style.

10 Claims, 25 Drawing Sheets

(51) Int. Cl.
*H04N 13/156* (2018.01)
*H04N 13/239* (2018.01)
*H04N 13/25* (2018.01)
*H04N 13/133* (2018.01)
*H04N 13/00* (2018.01)

(52) U.S. Cl.
CPC ......... *H04N 13/156* (2018.05); *H04N 13/239* (2018.05); *H04N 13/25* (2018.05); *G06T 2207/10012* (2013.01); *G06T 2207/10048* (2013.01); *G06T 2207/20081* (2013.01); *G06T 2207/20084* (2013.01); *G06T 2207/20212* (2013.01); *H04N 2013/0081* (2013.01)

(56) References Cited

U.S. PATENT DOCUMENTS

| | | | |
|---|---|---|---|
| 7,535,002 | B2 | 5/2009 | Johnson et al. |
| 8,902,321 | B2 | 12/2014 | Venkataraman et al. |
| 9,117,133 | B2 | 8/2015 | Barnes et al. |
| 9,536,293 | B2 | 1/2017 | Lin et al. |
| 9,973,696 | B1 | 5/2018 | Meler et al. |
| 10,380,753 | B1 | 8/2019 | Csordás et al. |
| 2006/0176242 | A1 | 8/2006 | Jaramaz et al. |
| 2007/0247517 | A1 | 10/2007 | Zhang et al. |
| 2009/0002220 | A1 | 1/2009 | Lovberg et al. |
| 2014/0152530 | A1 | 6/2014 | Venkatesha et al. |
| 2015/0234454 | A1 | 8/2015 | Kurz |
| 2016/0125585 | A1 | 5/2016 | Oh |
| 2016/0269714 | A1 | 9/2016 | Rhemann et al. |
| 2018/0211373 | A1 | 7/2018 | Stoppa et al. |
| 2018/0268237 | A1* | 9/2018 | Stanimirovic ....... G06K 9/2018 |
| 2018/0302564 | A1 | 10/2018 | Liu et al. |
| 2018/0322623 | A1 | 11/2018 | Memo et al. |
| 2019/0080517 | A1 | 3/2019 | You et al. |
| 2019/0096135 | A1 | 3/2019 | Dal Mutto et al. |
| 2019/0251401 | A1 | 8/2019 | Shechtman et al. |
| 2019/0295496 | A1 | 9/2019 | Wagner et al. |
| 2019/0304113 | A1 | 10/2019 | Huang |
| 2019/0318463 | A1 | 10/2019 | Zhang et al. |
| 2021/0158080 | A1 | 5/2021 | Price et al. |

OTHER PUBLICATIONS

Cygert, et al., "Style Transferfor Detecting Vehicles with Thermal Camera", In Proceedings of Signal Processing: Algorithms, Architectures, Arrangements, and Applications (SPA), Sep. 18, 2019, pp. 218-222.

"International Search Report and Written Opinion Issued in PCT Application No. PCT/US20/059902", dated Apr. 15, 2021, 23 Pages.

Aguilera, et al., "Multispectral Image Feature Points", In Journal of Sensors, vol. 12, Issue 9, Sep. 17, 2012, pp. 12661-12672.

Beaupre, et al., "Siamese CNNs for RGB-LWIR Disparity Estimation", In Proceedings of the IEEE Conference on Computer Vision and Pattern Recognition Workshops, Jun. 2019, 9 Pages.

Cardinal, David, "The Nokia 9 PureView penta-camera: How it works", Retrieved from: https://www.dxomark.com/the-nokia-9-pureview-penta-camera-how-it-works/, Sep. 6, 2019, 12 Pages.

Jeon, et al., "Stereo Matching with Color and Monochrome Cameras in Low-light Privileged and Confidential 6 KY/SG/AR Conditions", In Proceedings of the IEEE Conference on Computer Vision and Pattern Recognition, Jun. 27, 2016, pp. 4086-4094.

Jung, Yong Ju, "Enhancement of Low Light Level Images using Color-Plus-Mono Dual Camera", In Journal of Optics Express, vol. 25, No. 10, May 15, 2017, 23 Pages.

Li, et al., "Infrared and Visible Image Fusion using a Deep Learning Framework", In Journal of Computing Research Repository, Apr. 2018, 6 Pages.

Varugeese, Akshath, "Autoencoder for Converting an RBG Image to a GRAY Scale Image", Retrieved from: https://towardsdatascience.com/autoencoder-for-converting-an-rbg-image-to-a-gray-scale-image-3c19a11031c9, Nov. 12, 2018, 22 Pages.

Termin, et al., "Color Stereoscopic Images Requiring Only One Color Image", In Journal of Optical Engineering, vol. 46, Issue 8, Aug. 2007, 11 Pages.

"International Search Report and Written Opinion Issued in PCT Application No. PCT/US20/057609", dated Feb. 23, 2021, 13 Pages.

"Non Final Office Action Issued in U.S. Appl. No. 16/696,616", dated Sep. 2, 2021, 18 Pages.

\* cited by examiner

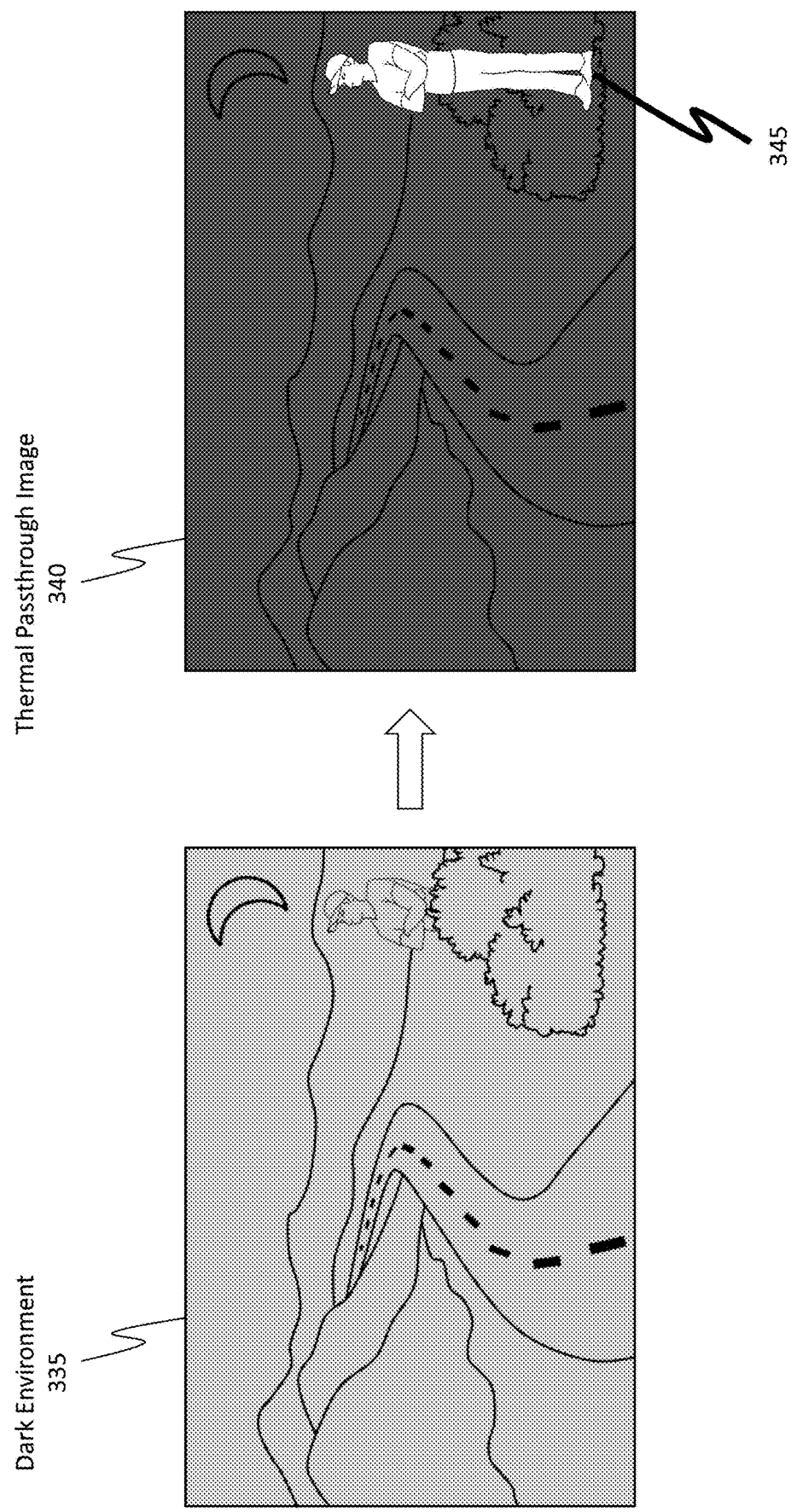

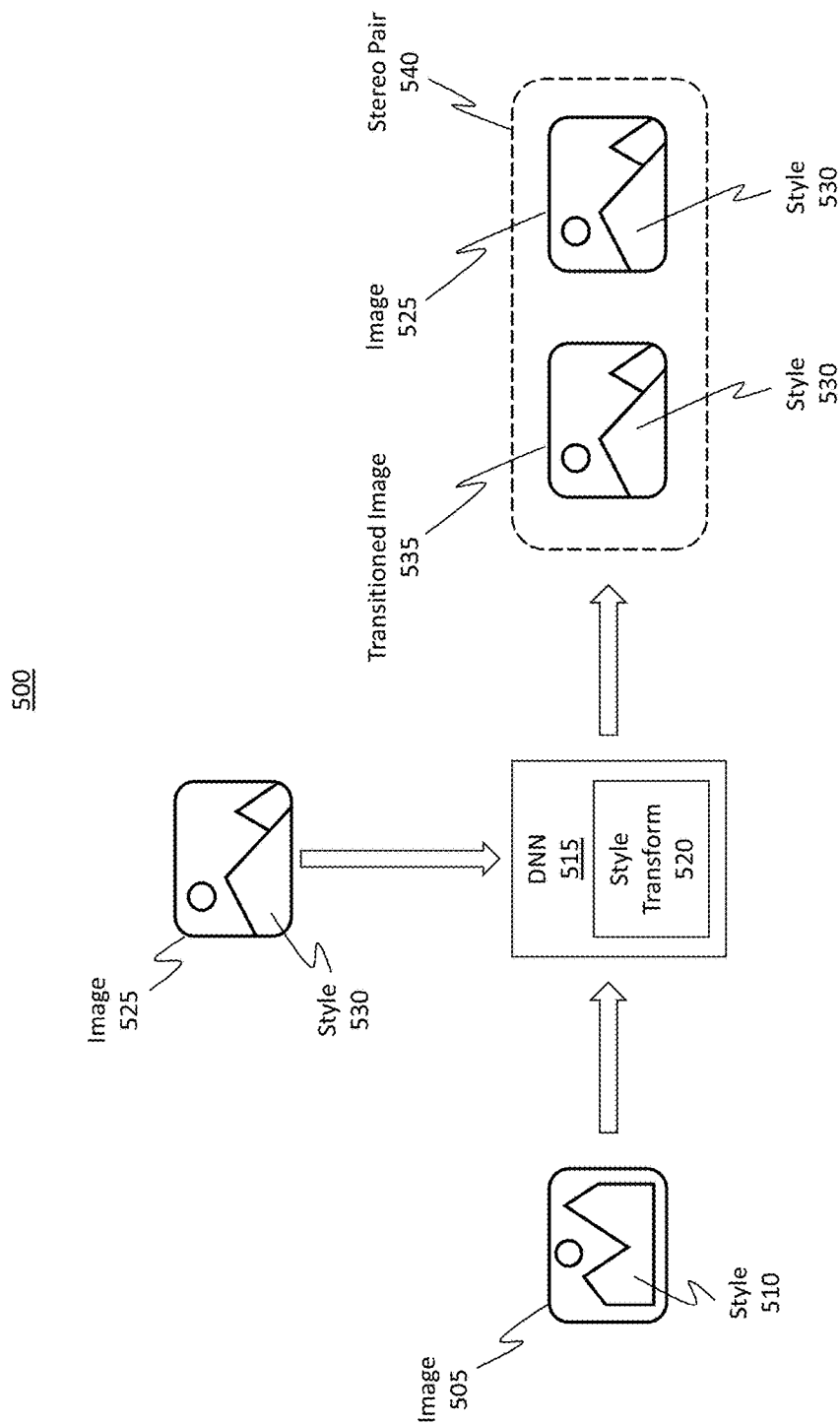

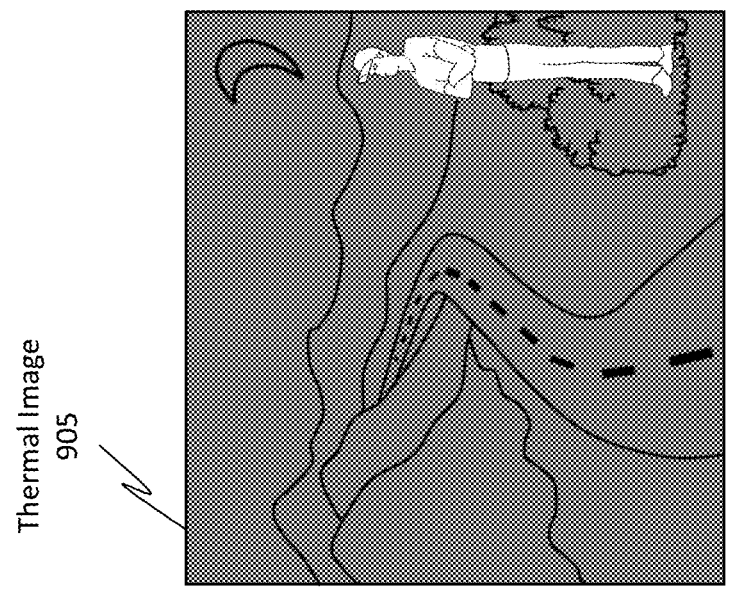
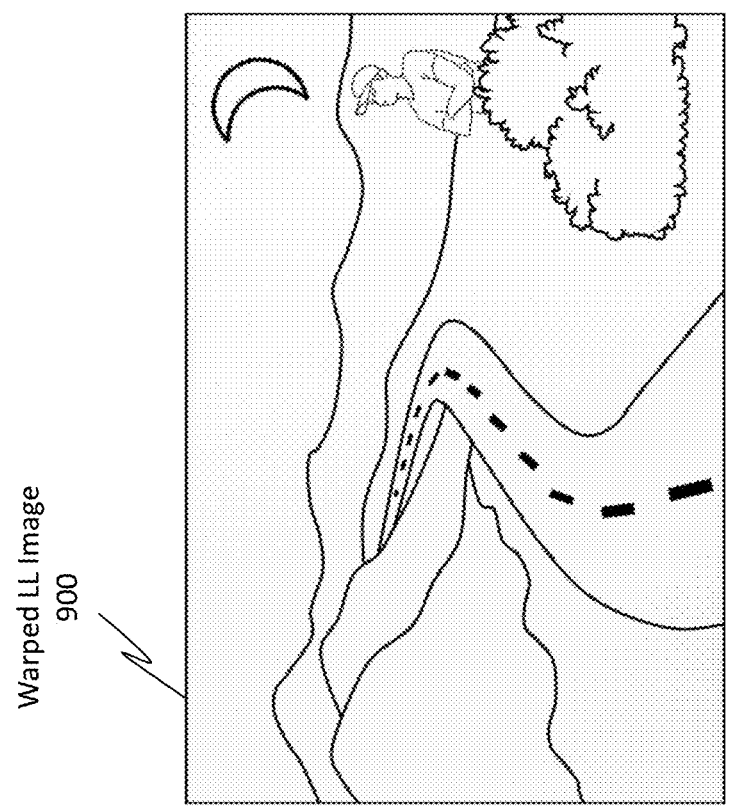
*Figure 9*

USING MACHINE LEARNING TO SELECTIVELY OVERLAY IMAGE CONTENT

BACKGROUND

Mixed-reality (MR) systems/devices include virtual-reality (VR) and augmented-reality (AR) systems. Conventional VR systems create completely immersive experiences by restricting users' views to only virtual images rendered in VR scenes/environments. Conventional AR systems create AR experiences by visually presenting virtual images that are placed in or that interact with the real world. As used herein, VR and AR systems are described and referenced interchangeably via use of the phrase "MR system." As also used herein, the terms "virtual image," "virtual content," and "hologram" refer to any type of digital image rendered by an MR system. Furthermore, it should be noted that a head-mounted device (HMD) typically provides the display used by the user to view and/or interact with holograms or display content provided within an MR scene.

Some MR systems have been developed to generate a so-called "passthrough" visualization of a user's real-world environment. For instance, in the context of a VR system, which completely obstructs a user's view of the real world, passthrough visualizations may be provided to display images of the environment to the user so the user need not have to remove or reposition the HMD. The passthrough visualizations are designed to mimic what a user would see if the user were not actually wearing the HMD. As the user moves his/her head or eyes, the passthrough visualizations are updated to display images reflective of what the user would have seen in the real-world without the HMD. In the context of an AR system, passthrough visualizations may be provided to enhance the user's view of his/her real-world environment by emphasizing certain identified objects within the real-world. Accordingly, as used herein, any type of MR system, including an AR system and a VR system, may be used to generate passthrough visualizations.

While some technologies are available for generating passthrough visualizations, the current technologies are seriously lacking. In particular, the current technology fails to optimize passthrough visualizations with enhanced data to provide an improved viewing experience for the user. Additionally, the current technology requires the use of a larger number of cameras in order to capture a sufficient number of images to generate the passthrough visualizations. The use of a larger number of cameras results in additional weight, cost, and battery usage.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to systems, methods, and devices (e.g., hardware storage devices, wearable devices, head-mounted devices, etc.) that improve the technology in numerous ways.

For instance, some embodiments modify a style of an image so the style subsequently corresponds to a different style. To do so, the embodiments access a first image generated by a first camera that generates images having a first style such that the first image has the first style. Additionally, a second image, which was generated by a second camera that generates images having a second style such that the second image has the second style, is also accessed. Subsequent to a deep neural network (DNN) learning the first style and the second style, a copy of the first image is fed as input to the DNN. The DNN then modifies the first image copy by transitioning the first image copy from being of the first style to subsequently being of the second style. As a consequence, a modified style of the transitioned first image copy bilaterally matches the second style.

In some embodiments, a DNN is trained to recognize styles of images captured by different types of cameras. To do so, a first image having a first style is accessed. This first image is generated by a first camera of a first camera type. Relatedly, a second image having a second style is also accessed. This second image is generated by a second camera of a second camera type. Additionally, the second camera is physically aligned with the first camera. Consequently, a perspective of the first image substantially corresponds with a perspective of the second image. As a result, the second image can operate as a "ground truth" image for images generated by the first camera or even for images derived from the first image. Attributes of the first image are then modified to cause the first image to transition from being of the first style to subsequently being of the second style such that a modified style of the transitioned first image bilaterally matches the second style. The transitioned first image is compared against the ground truth image to identify differences. The transitioned first image is repeatedly modified in an attempt to resolve these differences until a quality of correlation between the modified transitioned first image and the ground truth image satisfies a correlation threshold. By performing these processes, the DNN is trained on how to better transition one style to another style.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 3A, 3B, and 3C illustrate various examples of different types of passthrough images that may be generated by the HMD.

FIG. 5 illustrates how a deep neural network (DNN) is able to learn features and attributes of image styles and is further able to transform the style of an image into another style.

FIG. 9 illustrates an example of two images that capture the same environment but that have different styles.

DETAILED DESCRIPTION

Figure 1:
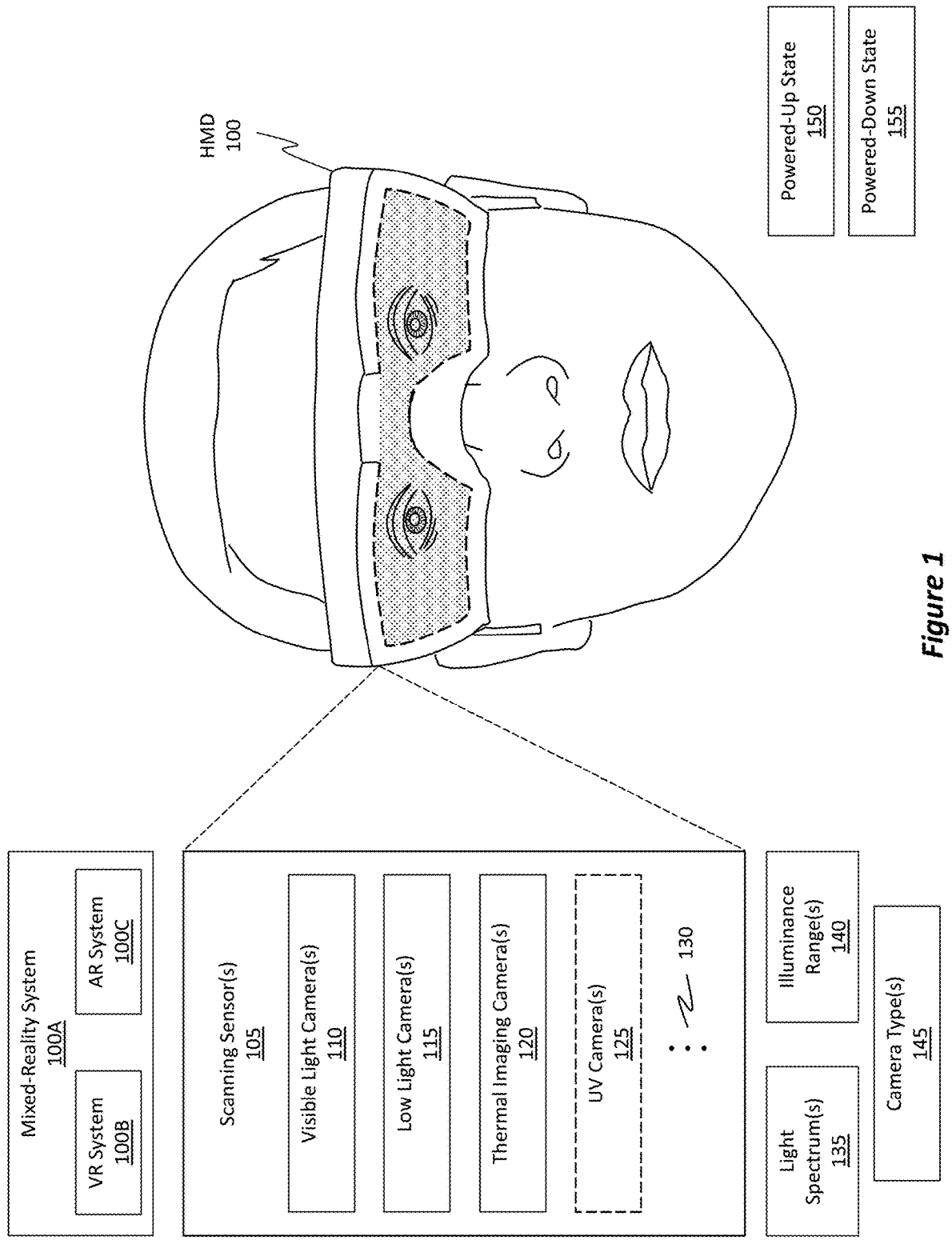
FIG. 1 illustrates an example head-mounted device (HMD) configured to perform any of the disclosed operations.

The disclosed embodiments relate to systems, methods, and devices (e.g., hardware storage devices, wearable devices, head-mounted devices, etc.) that improve the technology in numerous ways.

Some embodiments modify a style of an image so the style matches a different style. Initially, a first image is accessed, where the first image has a first style. A second image is also accessed, where the second image has a second style. Subsequent to a deep neural network (DNN) learning these styles, a copy of the first image is fed as input to the DNN. The DNN modifies the first image copy by transitioning the first image copy from being of the first style to subsequently being of the second style. As a consequence, a modified style of the transitioned first image copy bilaterally matches the second style.

In some embodiments, a DNN is trained to recognize styles of images captured by different types of cameras. Initially, a first image having a first style is accessed. Relatedly, a second image having a second style is also accessed. A perspective of the first image substantially corresponds with a perspective of the second image (e.g., either as a result of positioning of the cameras and/or as a result of performing parallax alignment corrections). As a result, the second image can operate as a so-called "ground truth" image for the first image, as well as any images generated or derived from the first image. The first image is modified to transition it from being of the first style to subsequently being of the second style. As such, the transitioned first image is derived from the first image. The transitioned first image is compared against the ground truth image to identify differences (e.g., differences may exist between a ground truth style embodied in the ground truth image and the programmatically inferred or derived style embodied in the transitioned first image). The transitioned first image is repeatedly modified in an attempt to resolve the differences. The DNN is trained on how to better modify an image so as to improve its style transitioning operations.

One will appreciate that any feature or operation of any embodiment disclosed herein may be combined with any other feature or operation of any other embodiment disclosed herein. That is, none of the disclosed embodiments are required to be mutually exclusive. Furthermore, any of the content disclosed in any of the figures may be combined with any of the other content disclosed in any of the other figures.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about substantial benefits to the technical field because they can be used to reduce the number of hardware cameras mounted on a computer system. For instance, by practicing the disclosed principles, the embodiments are able to transform the style of an image into another style using machine learning. In the context of this disclosure, a "machine learning algorithm" (or more simply just "machine learning") and a "DNN" are synonymous and may be interchanged with one another.

As an example of being able to reduce the number of cameras, the embodiments can transform a thermal image having thermal data into a low light image having low light data, or vice versa. By performing this transform, the embodiments can effectively reduce the number of cameras that are mounted on the computer system because now only a single camera of a particular type can be used. By reducing the number of cameras, significant reductions in weight, cost, and battery usage may be achieved.

The embodiments also include the ability to enhance one image with the data from another image. For instance, thermal data from a thermal image may be selectively overlaid onto a low light image. Notably, the embodiments are able to perform an improved alignment process using a DNN, even when the alignment occurs between differently styled images. By performing this improved alignment process, the embodiments are able to provide and display a composite image having a high quality.

Example HMDs & Scanning Systems

Attention will now be directed to FIG. 1, which illustrates an example of a head-mounted device (HMD) 100. HMD 100 can be any type of MR system 100A, including a VR system 100B or an AR system 100C. It should be noted that while a substantial portion of this disclosure is focused on the use of an HMD to scan an environment to provide a passthrough visualization (aka passthrough image), the embodiments are not limited to being practiced using only an HMD. That is, any type of scanning system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualization of the user's environment. As described earlier, a "passthrough" visualization refers to a visualization that reflects what the user would see if the user were not wearing the HMD 100, regardless of whether the HMD 100 is included as a part of an AR system or a VR system. To generate this passthrough visualization, the HMD 100 may use its scanning sensor(s) 105 to scan, map, or otherwise record its surrounding environment, including any objects in the environment, and to pass that data on to the user to view. In many cases, the passed-through data is modified to reflect or to correspond to a perspective of the user's pupils. The perspective may be determined by any type of eye tracking technique.

To convert a raw image into a passthrough image, the scanning sensor(s) 105 typically rely on its cameras (e.g., head tracking cameras, hand tracking cameras, depth cameras, or any other type of camera) to obtain one or more raw images of the environment. In addition to generating passthrough images, these raw images may also be used to determine depth data detailing the distance from the sensor to any objects captured by the raw images (e.g., a z-axis range or measurement). Once these raw images are obtained, then passthrough images can be generated (e.g., one for each pupil), and a depth map can also be computed from the depth data embedded or included within the raw images.

As used herein, a "depth map" details the positional relationship and depths relative to objects in the environment. Consequently, the positional arrangement, location, geometries, contours, and depths of objects relative to one another can be determined. From the depth maps (and possibly the raw images), a 3D representation of the environment can be generated.

Relatedly, from the passthrough visualizations, a user will be able to perceive what is currently in his/her environment without having to remove or reposition the HMD 100. Furthermore, as will be described in more detail later, the disclosed passthrough visualizations will also enhance the user's ability to view objects within his/her environment (e.g., by displaying additional environmental conditions that may not have been detectable by a human eye).

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include visible light camera(s) 110, low light camera(s) 115, thermal imaging camera(s) 120, and potentially (though not necessarily) ultraviolet (UV) cameras 125. The ellipsis 130 demonstrates how any other type of camera or camera system (e.g., depth cameras, time of flight cameras, etc.) may be included among the scanning sensor(s) 105. As an example, a camera structured to detect mid-infrared wavelengths (to be discussed in more detail later) may be included within the scanning sensor(s) 105.

Generally, a human eye is able to perceive light within the so-called "visible spectrum," which includes light (or rather, electromagnetic radiation) having wavelengths ranging from about 380 nanometers (nm) up to about 740 nm. As used herein, the visible light camera(s) 110 include two or more red, green, blue (RGB) cameras structured to capture light photons within the visible spectrum. Often, these RGB cameras are complementary metal-oxide-semiconductor (CMOS) type cameras, though other camera types may be used as well (e.g., charge coupled devices, CCD).

The RGB cameras are typically stereoscopic cameras, meaning that the fields of view of the two or more RGB cameras at least partially overlap with one another. With this overlapping region, images generated by the visible light camera(s) 110 can be used to identify disparities between certain pixels that commonly represent an object captured by both images. Based on these pixel disparities, the embodiments are able to determine depths for objects located within the overlapping region (i.e. stereoscopic depth matching). As such, the visible light camera(s) 110 can be used to not only generate passthrough visualizations, but they can also be used to determine object depth. In some embodiments, the visible light camera(s) 110 can capture both visible light and IR light. The visible light spectrum is included within the light spectrum(s) 135.

The low light camera(s) 115 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. The low light camera(s) 115 are structured to detect or be sensitive to IR light in at least the near-IR range. The near-IR, mid-IR, and far-IR ranges are also included in the light spectrum(s) 135.

In some embodiments, the visible light camera(s) 110 and the low light camera(s) 115 (aka low light night vision cameras) operate in approximately the same overlapping wavelength range. In some cases, this overlapping wavelength range is between about 400 nanometers and about 1,000 nanometers. Additionally, in some embodiments these two types of cameras are both silicon detectors.

One distinguishing feature between these two types of cameras is related to the illuminance conditions or illuminance range(s) 140 in which they actively operate. In some cases, the visible light camera(s) 110 are low power cameras and operate in environments where the illuminance is between about 10 lux and about 100,000 lux, or rather, the illuminance range begins at about 10 lux and increases beyond 10 lux. In contrast, the low light camera(s) 115 consume more power and operate in environments where the illuminance range is between about 1 milli-lux and about 10 lux. These different illuminance operational ranges are included in the illuminance range(s) 140.

The thermal imaging camera(s) 120, on the other hand, are structured to detect electromagnetic radiation or IR light in the far-IR (i.e. thermal-IR) range, though some embodiments also enable the thermal imaging camera(s) 120 to detect radiation in the mid-IR range. To clarify, the thermal imaging camera(s) 120 may be a long wave infrared imaging camera structured to detect electromagnetic radiation by measuring long wave infrared wavelengths. Often, the thermal imaging camera(s) 120 detect IR radiation having wavelengths between about 8 microns and 14 microns. These wavelengths are also included in the light spectrum(s) 135. Because the thermal imaging camera(s) 120 detect far-IR radiation, the thermal imaging camera(s) 120 can operate in any illuminance condition, without restriction.

In some cases (though not all), the thermal imaging camera(s) 120 include an uncooled thermal imaging sensor. An uncooled thermal imaging sensor uses a specific type of detector design that is based on a bolometer, which is a device that measures the magnitude or power of an incident electromagnetic wave/radiation. To measure the radiation, the bolometer uses a thin layer of absorptive material (e.g., metal) connected to a thermal reservoir through a thermal link. The incident wave strikes and heats the material. In response to the material being heated, the bolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 125 are structured to capture light in the UV range. The UV range includes electromagnetic radiation having wavelengths between about 10 nm and about 400 nm. These wavelength ranges are also included in the light spectrum(s) 135. The disclosed UV camera(s) 125 should be interpreted broadly and may be operated in a manner that includes both reflected UV photography and UV induced fluorescence photography.

Accordingly, as used herein, reference to "visible light cameras" (including "head tracking cameras"), are cameras that are primarily used for computer vision to perform head tracking. These cameras can detect visible light, or even a combination of visible and IR light (e.g., a range of IR light, including IR light having a wavelength of about 850 nm). In some cases, these cameras are global shutter devices with pixels being about 3 μm in size. Low light cameras, on the other hand, are cameras that are sensitive to visible light and near-IR. These cameras are larger and may have pixels that are about 8 μm in size or larger. These cameras are also sensitive to wavelengths that silicon sensors are sensitive to, which wavelengths are between about 350 nm to 1100 nm. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 nm to 2 μm wavelength range.

Accordingly, the disclosed embodiments may be structured to utilize numerous different camera type(s) 145. The different camera type(s) 145 include, but are not limited to, visible light cameras, low light cameras, thermal imaging cameras, and UV cameras.

FIG. 1 also shows a powered-up state 150 and a powered-down state 155. Generally, the low light camera(s) 115, the thermal imaging camera(s) 120, and the UV camera(s) 125 (if present) consume relatively more power than the visible light camera(s) 110. Therefore, when not in use, the low light camera(s) 115, the thermal imaging camera(s) 120, and the UV camera(s) 125 are typically in the powered-down state 155 in which those cameras are either turned off (and thus consuming no power) or in a reduced operability mode (and thus consuming substantially less power than if those cameras were fully operational). In contrast, the visible light camera(s) 110 are typically in the powered-up state 150 in which those cameras are by default fully operational.

It should be noted that any number of cameras may be provided on the HMD 100 for each of the different camera type(s) 145. That is, the visible light camera(s) 110 may include 1, 2, 3, 4, 5, 6, 7, 8, 9, 10, or more than 10 cameras. Often, however, the number of cameras is at least 2 so the HMD 100 can perform stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

Figure 2:
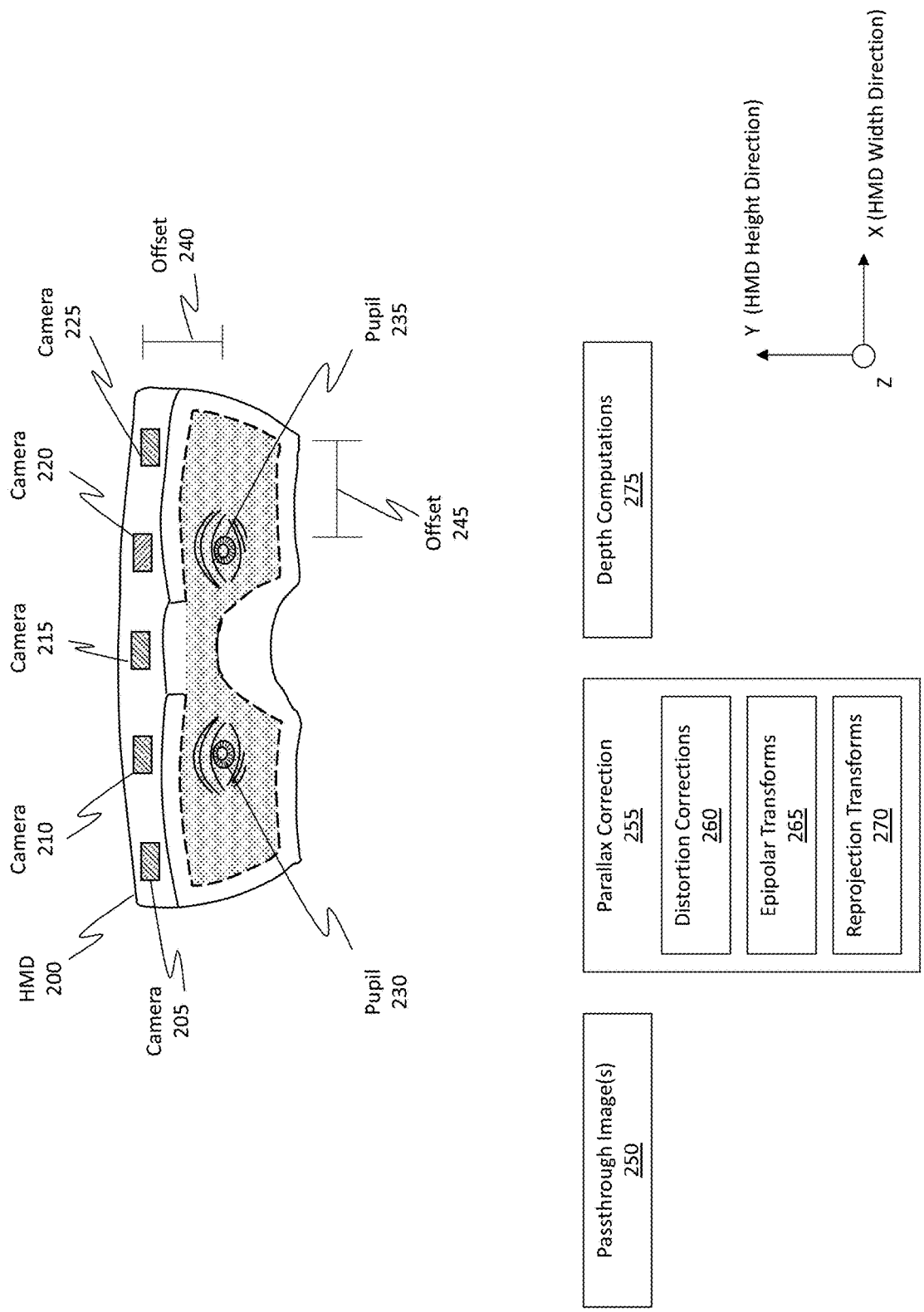
FIG. 2 illustrates an HMD configured to generate passthrough images using cameras mounted on the HMD.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, and the UV camera(s) 125 from FIG. 1. While only 5 cameras are illustrated in FIG. 2, HMD 200 may include more or less than 5 cameras.

In some cases, the cameras can be located at specific positions on the HMD 200. For instance, in some cases a first camera (e.g., perhaps camera 220) is disposed on the HMD 200 at a position above a designated left eye position of any users who wear the HMD 200 relative to a height direction of the HMD. For instance, the camera 220 is positioned above the pupil 235. As another example, the first camera (e.g., camera 220) is additionally positioned above the designated left eye position relative to a width direction of the HMD. That is, the camera 220 is positioned not only above the pupil 235 but also in-line relative to the pupil 235. When a VR system is used, a camera may be placed directly in front of the designated left eye position. For example, with reference to FIG. 2, a camera may be physically disposed on the HMD 200 at a position in front of the pupil 235 in the z-axis direction.

When a second camera is provided (e.g., perhaps camera 210), the second camera may be disposed on the HMD at a position above a designated right eye position of any users who wear the HMD relative to the height direction of the HMD. For instance, the camera 210 is above the pupil 230. In some cases, the second camera is additionally positioned above the designated right eye position relative to the width direction of the HMD. In some cases, the first camera is a low light camera, and the HMD includes a single low light camera. In some cases, the second camera is a thermal imaging camera, and HMD includes a single thermal imaging camera. Although a single low light camera and a single thermal imaging camera may be disposed on the HMD, the HMD may include multiple visible light RGB cameras. When a VR system is used, a camera may be placed directly in front of the designated right eye position. For example, with reference to FIG. 2, a camera may be physically disposed on the HMD 200 at a position in front of the pupil 230 in the z-axis direction.

When a user wears HMD 200, HMD 200 fits over the user's head and the HMD 200's display is positioned in front of the user's pupils, such as pupil 230 and pupil 235. Often, the cameras 205-225 will be physically offset some distance from the user's pupils 230 and 235. For instance, there may be a vertical offset in the HMD height direction (i.e. the "Y" axis), as shown by offset 240. Similarly, there may be a horizontal offset in the HMD width direction (i.e. the "X" axis), as shown by offset 245.

As described earlier, HMD 200 is configured to provide passthrough image(s) 250 for the user of HMD 200 to view. In doing so, HMD 200 is able to provide a visualization of the real world without requiring the user to remove or reposition HMD 200. These passthrough image(s) 250 effectively represent the same view the user would see if the user were not wearing HMD 200. Cameras 205-225 are used to provide these passthrough image(s) 250.

None of the cameras 205-225, however, are directly aligned with the pupils 230 and 235. The offsets 240 and 245 actually introduce differences in perspective as between the cameras 205-225 and the pupils 230 and 235. These perspective differences are referred to as "parallax."

Because of the parallax occurring as a result of the offsets 240 and 245, raw images produced by the cameras 205-225 are not available for immediate use as passthrough image(s) 250. Instead, it is beneficial to perform a parallax correction 255 (aka an image synthesis) on the raw images to transform the perspectives embodied within those raw images to correspond to perspectives of the user's pupils 230 and 235. The parallax correction 255 includes any number of distortion corrections 260 (e.g., to correct for concave or convex wide or narrow angled camera lenses), epipolar transforms 265 (e.g., to parallelize the optical axes of the cameras), and/or reprojection transforms 270 (e.g., to reposition the optical axes so as to be essentially in front of or in-line with the user's pupils). The parallax correction 255 includes performing depth computations 275 to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

By performing these different transforms, the embodiments are able to perform three-dimensional (3D) geometric transforms on the raw camera images to transform the perspectives of the raw images in a manner so as to correlate with the perspectives of the user's pupils 230 and 235.

Additionally, the 3D geometric transforms rely on depth computations 275 in which the objects in the HMD 200's environment are mapped out to determine their depths. Based on these depth computations 275, the embodiments are able to three-dimensionally reproject or three-dimensionally warp the raw images in such a way so as to preserve the appearance of object depth in the passthrough image(s) 250, where the preserved object depth substantially matches, corresponds, or visualizes the actual depth of objects in the real world. Accordingly, the degree or amount of the parallax correction 255 is at least partially dependent on the degree or amount of the offsets 240 and 245.

By performing the parallax correction 255, the embodiments effectively create "virtual" cameras having positions that are in front of the user's pupils 230 and 235. By way of additional clarification, consider the position of camera 205, which is currently above and to the left of the pupil 230. By performing the parallax correction 255, the embodiments programmatically transform images generated by camera 205, or rather the perspectives of those images, so the perspectives appear as though camera 205 were actually positioned immediately in front of pupil 230. That is, even though camera 205 does not actually move, the embodiments are able to transform images generated by camera 205 so those images have the appearance as if camera 205 were positioned in front of pupil 230.

Passthrough Images

As an initial matter, it is noted that MR systems are often used in many different environments. Some environments are brightly lit, some are dimly lit, and some have combinations of brightly lit areas and dimly lit areas.

For reference, a bright sunny day typically has an ambient light intensity of around 10,000-50,000 lux. An overcast day typically has an ambient light intensity of around 1,000-10,000 lux. An indoor office typically has an ambient light intensity of around 100-300 lux. The time of day corresponding to twilight typically has an ambient light intensity of around 10 lux. Deep twilight has an ambient light intensity of around 1 lux. As used herein, a "dim" or "low" light environment or area at least corresponds to any environment or area in which the ambient light intensity is at or below about 40 lux. A "bright" light environment or area at least corresponds to any environment or area in which the ambient light intensity is at or above about 5,000 lux. A "dark" environment at least corresponds to any environment or area in which the light intensity is below about 1 lux. Unless specified as being a "low" light or a "dark" environment, reference to a "lighted" environment corresponds to any environment or area that is above about 40 lux.

The different types of cameras mentioned relative to FIG. 1 can be used to provide passthrough images based on the luminosity or lux conditions of the surrounding environment. For example, one type of camera may be used for a lighted environment while another type of camera may be used for a low light environment. That is, the different camera types may optionally be triggered or activated based on the detected light conditions of the environment. When the different cameras are triggered, they can be used to generate different types of passthrough images.

Figure 3A:
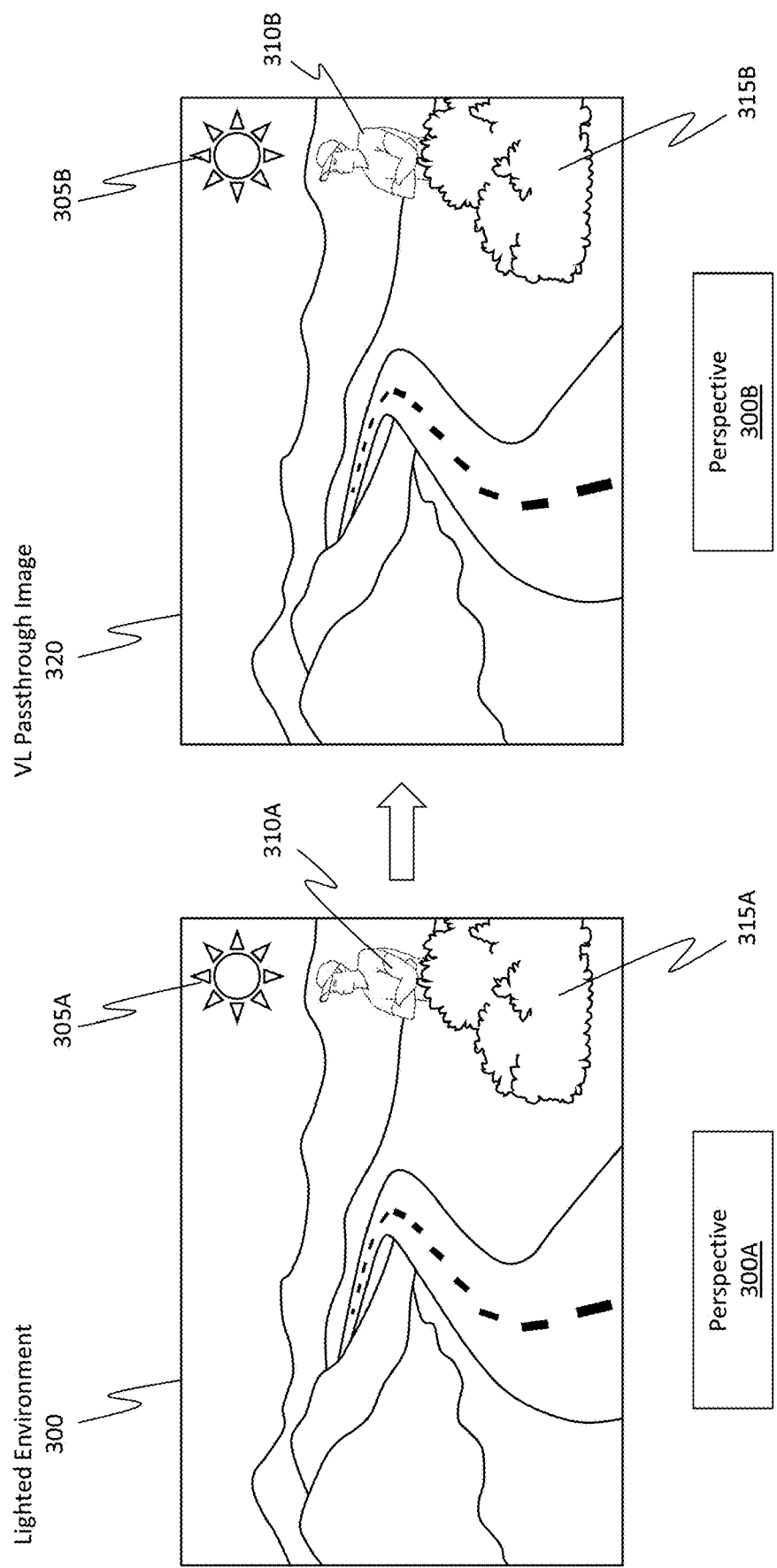
Figure 3B:
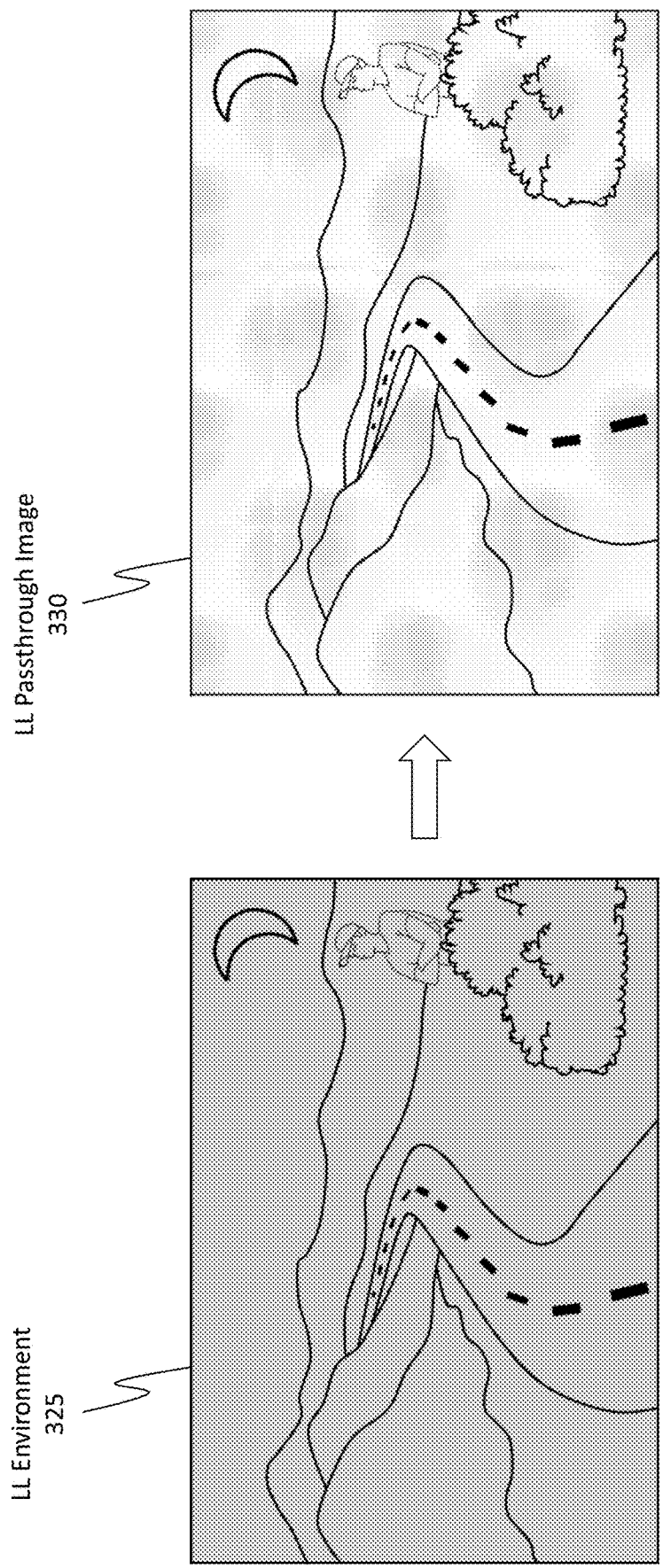

FIGS. 3A, 3B, and 3C illustrate some examples of different passthrough images that may be generated using the different types of cameras (e.g., such as the different camera type(s) 145 from FIG. 1) for differently illuminated environments. These passthrough images may be generated by any of the HMDs discussed thus far.

FIG. 3A shows a lighted environment 300 (e.g., an environment that is above about 40 lux). From the perspective 300A shown in FIG. 3A, lighted environment 300 includes the sun 305A and a person 310A standing at least partially behind a bush 315A. Using visible light cameras, such as visible light camera(s) 110 from FIG. 1, the cameras are able to generate a visible light (VL) passthrough image 320 having a perspective 300B matching, correlating, or otherwise corresponding to the perspective 300A. Additionally, one will appreciate that while only a single passthrough image is shown in FIG. 3A, the embodiments may generate two VL passthrough images, one for each eye of a user.

Because perspective 300B matches perspective 300A, the VL passthrough image 320 includes a sun 305B, which corresponds to sun 305A, a person 310B, which corresponds to person 310A, and a bush 315B, which corresponds to bush 315A. Because VL passthrough image 320 is a visible light image, the person 310B is still at least partially occluded by the bush 315B.

FIG. 3B illustrates a low light (LL) environment 325 and a corresponding LL passthrough image 330. The dark region in LL environment 325 symbolizes the low amount of light in the LL environment 325. Notwithstanding this low light condition, the embodiments are able to trigger or utilize their low light cameras, such as low light camera(s) 115 from FIG. 1, to generate the LL passthrough image 330 (or multiple images). The dot pattern overlaid on the LL passthrough image 330 symbolizes how it is different from the VL passthrough image 320. Furthermore, notwithstanding the darker environment, the objects in the LL environment 325 are still identifiable in the LL passthrough image 330. Notice also how the person is still at least partially occluded by the bush, as seen in the LL passthrough image 330.

FIG. 3C illustrates a dark environment 335 and a corresponding thermal passthrough image 340. The dark region in the dark environment 335 symbolizes the darkness of the dark environment 335. Notwithstanding this darkness, the embodiments are able to utilize their thermal imaging camera(s), such as thermal imaging camera(s) 120 from FIG. 1, to generate the thermal passthrough image 340 (or multiple images). Because the thermal imaging camera detects temperature, the temperature signature of the person 345 is clearly displayed in the thermal passthrough image 340. In this specific case, the bush does not fully occlude the thermal signature of the person 345. In cases where the bush is very dense or an intervening object is fully occluding, then the thermal imaging camera may not be able to detect temperatures, temperature gradients, or heat signatures because of the blocking object. Use of the thermal imaging camera is still highly beneficial, however, because thermal data that is acquired may be used to enhance the resulting passthrough images.

Other areas of the dark environment 335 may also be detected by the thermal imaging camera if those areas have a corresponding thermal signature and if those thermal signatures are different from the thermal signatures of areas or objects surrounding those other areas. If the thermal signatures are all relatively the same, then the thermal passthrough image 340 may show those objects as substantially merging with one another, without boundaries or distinctions (e.g., a majority of the thermal passthrough image 340 is all dark because the heat signatures of most of the dark environment 335 are the same in this example). On the other hand, for objects whose thermal signatures do vary or are different (e.g., the person 345 as compared to the bush), those objects will be clearly distinguished in the thermal passthrough image 340. Accordingly, the disclosed embodiments are able to trigger the use of different types of cameras based on the detected environmental conditions.

Image Styles

When a camera operates in a particular mode (e.g., operates in a .jpeg mode, a .gif mode, a .tiff mode, a .png mode, a .heic mode, a .bmp mode, a .dib mode, a .jpg mode, a .jpe mode, a .jfif mode, an RGB mode, a low light mode, a thermal mode, and others) to generate an image (e.g., a visible light image, a LL image, a thermal image, a monochrome image, an RGB image, and so forth), the camera performs numerous different types of operations to generate the resulting image.

By way of example, the camera obtains or reads the raw digital data from the camera's image sensors and converts that raw data into an image in accordance with the selected operational mode (e.g., any of the modes described above). Other operations may also be applied, including compression operations, sharpening operations, color balancing operations, saturation operations, contrast operations, editing operations, and so forth.

As used herein, the term "style" generally refers to any collection of image editing operations that are used to generate an image having a determined set of characteristics. By way of example, many imaging programs include the following types of styles: a marker style (e.g., a style in which an image is portrayed as if it were drawn using a marker), a pencil sketch style (e.g., a style in which an image is portrayed as if it were drawn using a pencil), a line drawing style (e.g., a style in which an image is portrayed as if it were a composite of lines or line shading), a chalk style (e.g., a style in which an image is portrayed as if it were drawn using chalk), a paint brush style (e.g., a style in which an image is portrayed as if it were drawn using a paint brush), and numerous others.

Figure 4:
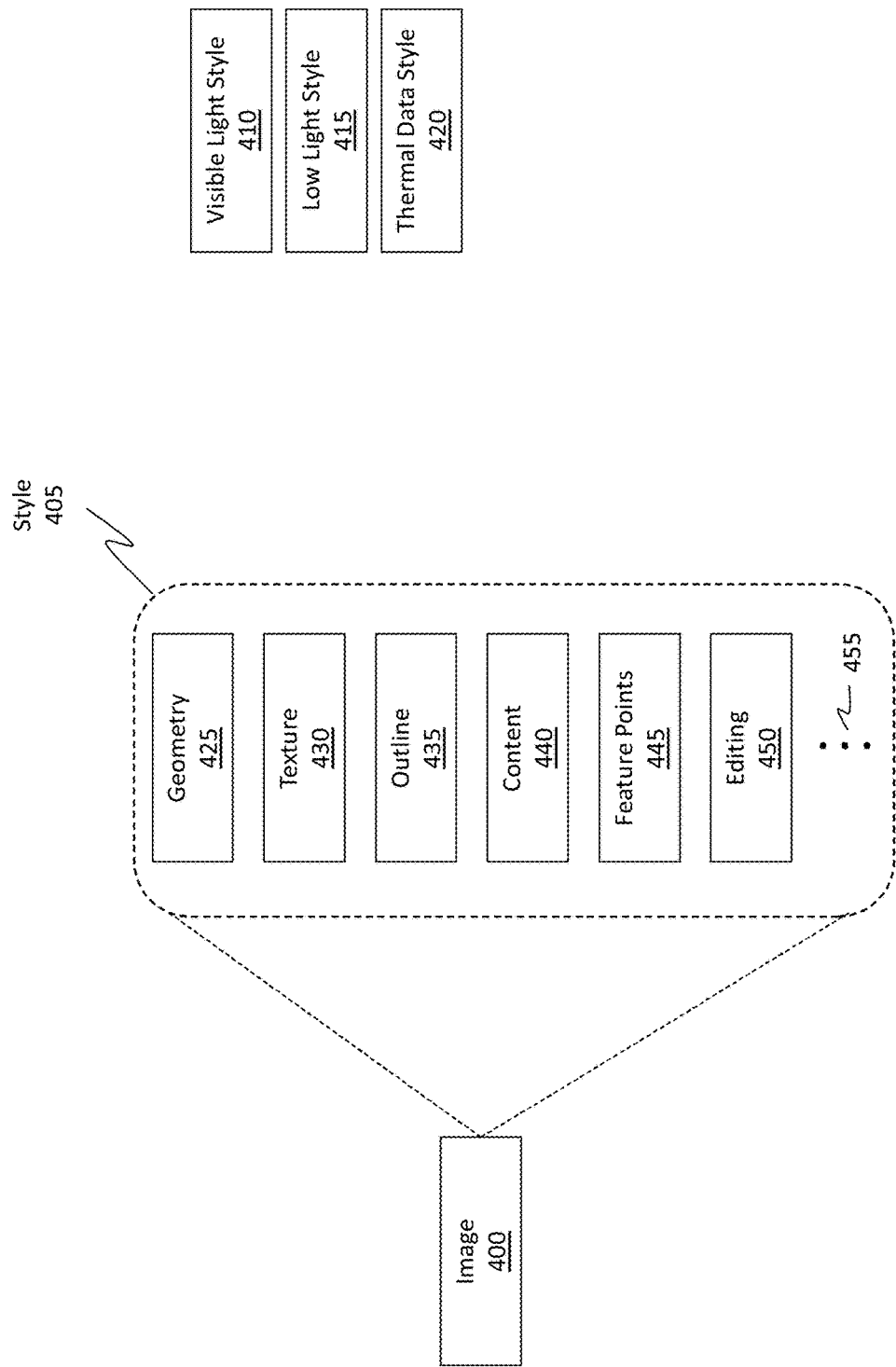
FIG. 4 illustrates how an image may have a particular style and further illustrates various features of an image's style.

FIG. 4 illustrates an example image 400 with its corresponding style 405. Image 400 is representative of any type of image, including visible light images, low light images, thermal images, and even UV images. Style 405 reflects the features, attributes, characteristics, and image editing operations that are performed on the image 400 to configure the image in a determined manner (e.g., as having a marker style, as having a pencil sketch style, etc.). In the context of this disclosure, there are three primary styles, though other styles may be used. These styles include a visible light style 410, a low light style 415, and a thermal data style 420. The VL passthrough image 320 of FIG. 3A embodies the visible light style 410, the LL passthrough image 330 of FIG. 3B embodies the low light style 415, and the thermal passthrough image 340 of FIG. 3C embodies the thermal data style 420.

Style 405 is shown as encompassing different features or attributes. In particular, style 405 includes, but is not limited to, geometry 425, texture 430, outline 435, content 440, feature points 445, and editing 450. The ellipsis 455 represents how any other feature, characteristic, or editing operation may be included in style 405. For instance, a camera's pixel size, wavelength sensitivity, and ambient light sensitivity may also be included in the style 405.

Geometry 425 generally refers to the perspective captured by the image 400. Any type of 3D geometry correction may be performed to digitally transform or manipulate the image 400's data so that the image's projection corresponds to or matches a specific projection perspective, surface, or shape. Texture 430 generally refers to a set of metrics that quantify or represent the texture of an image. This texture information describes or represents the spatial arrangement of light, color, or intensities in the image. Outline 435 generally refers to the shapes, contours, or geometries of any objects in the image 400 and/or the actual boundaries of the image 400 itself. Content 440 refers to the image data or image content included within image 400. Feature points 445 include any detectable anchor or feature points that are included in the image 400. As used herein, "anchor" or "feature" points generally refer to points in the image that are identified as being recognizable and associated with an identified object. For instance, the four points of a door frame are recognizable as being a part of a clearly defined object (i.e. the door frame) having determined geometric attributes whereas points on a white wall may not be readily recognizable. Finally, editing 450 refers to any image editing operation that may be performed on the image 400 to preserve or configure the image to embody a particular style.

In accordance with the disclosed principles, the embodiments are able to transform an image embodying one style into an image embodying a different style. For instance, the embodiments are able to transform a visible light RGB image having the visible light style 410 into a low light image having the low light style 415. Alternatively, the embodiments are able to transform the visible light RGB image into a thermal image having the thermal data style 420. Additionally, the embodiments are able to transform a low light image having the low light style 415 into either a visible light RGB image having the visible light style 410 or a thermal image having the thermal data style 420. To complete the example, the embodiments are additionally able to transform a thermal image having the thermal data style 420 into either a visible light RGB image having the visible light style 410 or a low light image having the low light style 415.

Style Transforms

FIG. 5 illustrates an example style transform process 500 in which the embodiments transform the style of an image into a different style. FIG. 5 initially shows an image 505 having a style 510. Similar to the earlier discussion, image 505 may be any type of image, including a visible light RGB image, a low light image, or a thermal image. Style 510 may be any type of style, including the visible light style 410, the low light style 415, or the thermal data style 420 of FIG. 4.

In accordance with the disclosed embodiments, a deep neural network (DNN) 515 is able to learn the different styles, including the features, characteristics, and editing operations involved in configuring an image to have a particular style. In addition to learning the different styles, the DNN 515 is also able to transform a style of an image into another style, as shown by style transform 520. In accordance with at least some of the disclosed embodiments, a thermal imager may also be used to identify or analyze thermal imaging data and/or perhaps to transform image styles. By way of example, a thermal imager may be used to identify "hot" or "cold" areas in a thermal image. Sometimes, the image presented by the thermal imaging camera maps all portions, both hot and cold, to the image presented to the user. The thermal imager is able to analyze this image to identify relevant portions (e.g., hot portions or perhaps cold portions) and extract or otherwise flag those portions. The extracted or flagged portions may then be used as an overlay such that those portions (as opposed to other portions from the thermal image data) are presented to the user.

As used herein, reference to any type of "DNN" or more generally "machine learning" may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations. Subject matter related to how the DNN 515 is trained will be provided later.

FIG. 5 shows another image 525 having a style 530, which is different from style 510. In some cases, style 510 may be any one of the visible light style 410, the low light style 415, or the thermal data style 420 from FIG. 4 while the style 530 may be any other one of the visible light style 410, the low light style 415, or the thermal data style 420. The DNN 515 is able to receive, as input, a selected type of style to which the DNN 515 is to transform style 510 into. For instance, in this case, the DNN 515 is to transform style 510 into the style 530 by performing the style transform 520. The style transform 520 includes any modifications to the geometry 425, texture 430, outline 435, content 440, feature points 445, or editing 450 as described in FIG. 4. As a result of performing the style transform 520, image 505 is transformed to become transitioned image 535 now having style 530. Together, the combination of transitioned image 535 and image 525, both of which have the same style 530, can constitute a stereo pair 540 of images.

By way of additional clarification, in accordance with the disclosed principles, the embodiments are able to utilize two cameras (e.g., 1 LL camera or 1 visible light camera in combination with 1 thermal imaging camera) to then generate 4 images in accordance with the above technique. The resulting 4 images will include a first stereo pair of LL images and a second stereo pair of thermal images. In this regard, there are now 4 images (two of which were programmatically generated based on performing a style change) that fully represent the environment/scene and are able to represent the environment in two different manners (e.g., in a LL manner and in a thermal manner). These two sets of stereoscopic images are generated from a single LL camera (or perhaps visible light camera) and a single thermal imaging camera.

If the stereo pair 540 include overlapping content, then the stereo pair 540 may be used to compute depth for an environment or even to provide passthrough visualizations/images. For example, and with reference to FIG. 2, suppose camera 205 is a thermal imaging camera and suppose camera 225 is a low light camera. Image 505 may be a thermal image generated by the thermal imaging camera, and image 525 may be a low light camera generated by the low light camera. Further suppose that the HMD 200 of FIG. 2 includes only a single thermal imaging camera and a single low light camera (though it may include multiple visible light cameras). In this scenario, because there is only a single thermal imaging camera, the HMD traditionally would not be able to perform stereoscopic depth matching (e.g., using thermal data) because only a single thermal image from a single perspective is generated. Similarly, the HMD traditionally would not be able to perform stereoscopic depth matching (e.g., using low light data) because only a single low light image from a single perspective is generated.

In accordance with the disclosed principles, however, the embodiments are now able to perform stereoscopic depth matching and/or passthrough image generation even when only a single thermal imaging camera or a single low light camera is provided. That is, through the use of the DNN 515, the embodiments are able to effectively transform the style of one image into a different style to ensure that there are two images of the same style type to perform passthrough generation and/or stereoscopic depth matching.

Figure 6A:
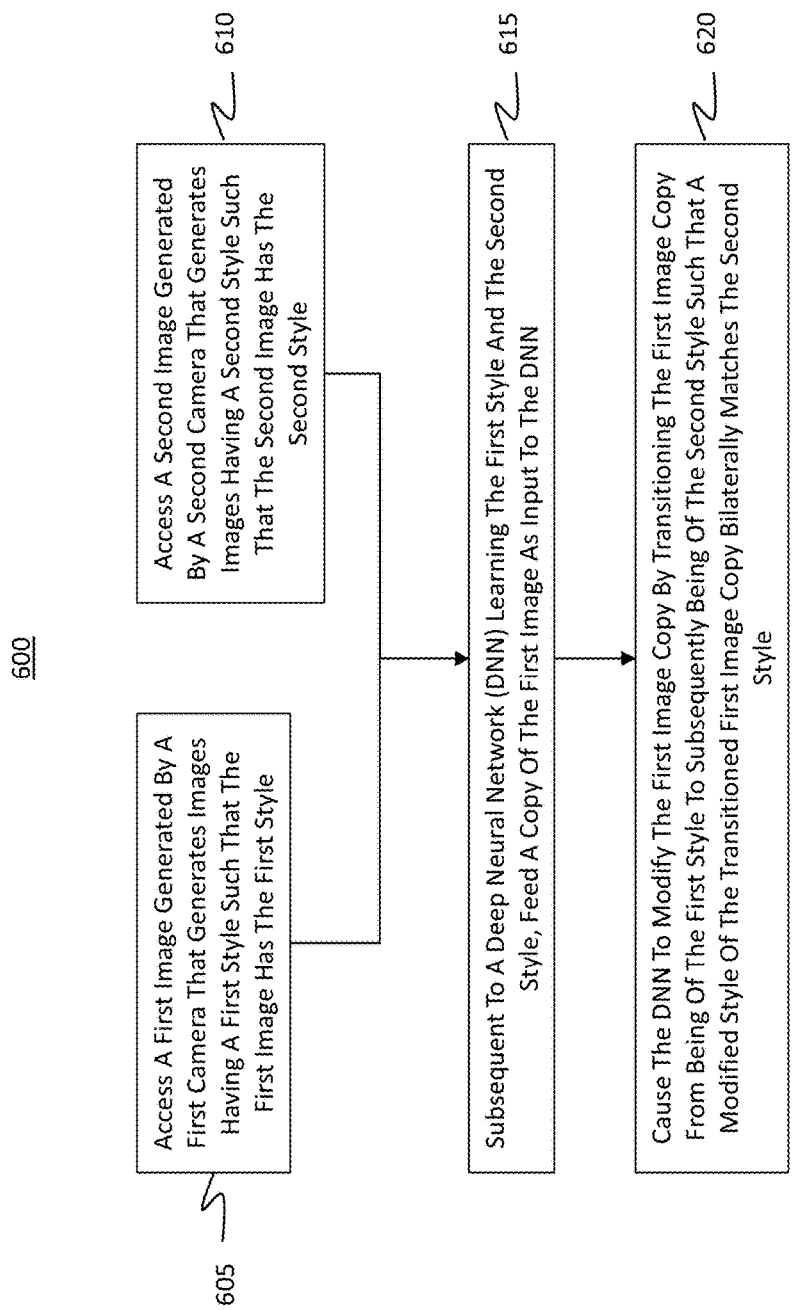
FIGS. 6A and 6B illustrate a flowchart of an example method for transitioning the style of an image into another style.
Figure 6B:
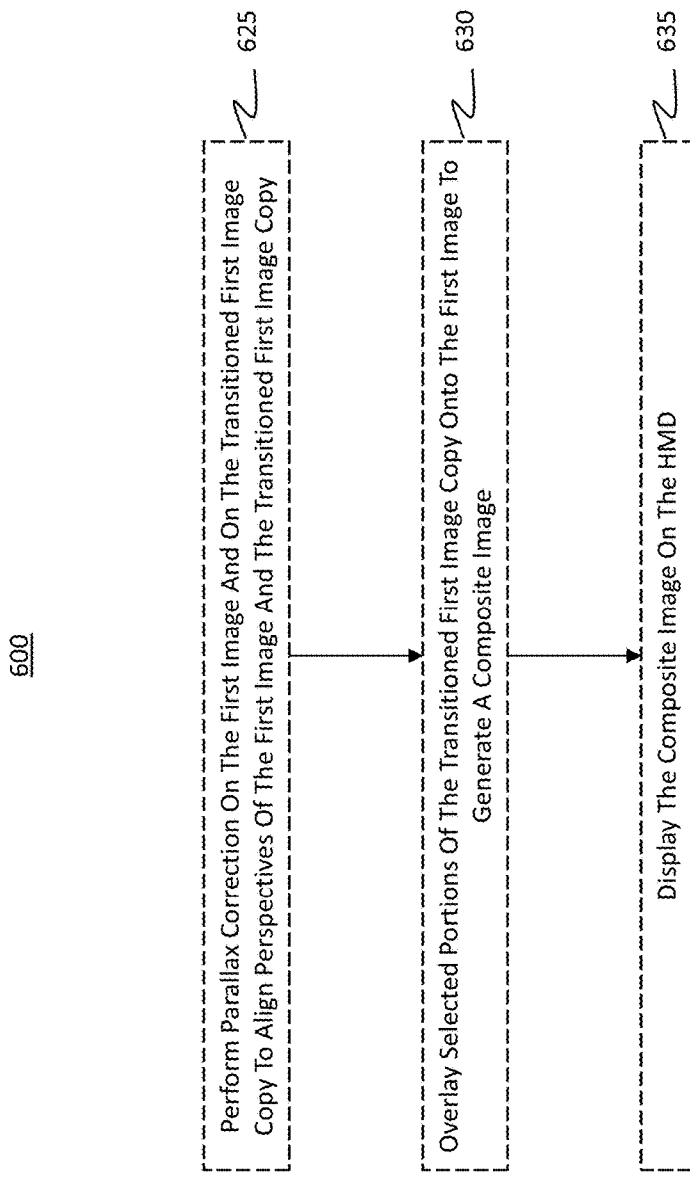

Because camera 205 generates images from one perspective and camera 225 generates images from another perspective (while also having overlapping content), the two perspectives can be used to perform stereoscopic depth matching in the manner described earlier. By way of additional clarification, transitioned image 535, which is derived from image 505, embodies one perspective and is now of style 530 as a result of the style transform 520 (whereas image 505 is of style 510). Image 525 may embody another perspective and be of style 530. Using both the transitioned image 535 and the image 525, the embodiments are able to perform stereoscopic depth matching and are also able to generate passthrough images using images having the same style and same type of image data (e.g., if the style 530 is the low light style 415, then both the transitioned image 535 and the image 525 include low light data even though the image 505 included a different type of data). FIGS. 6A and 6B describe some example methods that generally correlate to the style transform process 500 of FIG. 5.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 6A shows a flowchart of an example method 600, which may be performed by any of the disclosed HMDs or which may be performed by any other type of computing system, to modify a style of an image so the style subsequently corresponds to a different style.

Initially, method 600 includes an act (act 605) of accessing a first image generated by a first camera that generates images having a first style such that the first image has or is of the first style. For instance, the first image may correspond to image 505 of FIG. 5, and the first style may correspond to style 510. The first camera may be any one of the cameras discussed thus far, and the first style will correspond to that camera's type (e.g., a visible light camera generates images having the visible light style, and so on). In some cases, the first camera is a visible light camera structured to detect light spanning a first range of illuminance (e.g., between about 10 lux and 100,000 lux) such that the first image is a visible light image.

Either concurrently with act 605 or in serial with act 605, there is an act (act 610) of accessing a second image generated by a second camera that generates images having a second style such that the second image has the second style. For instance, image 525 and style 530 from FIG. 5 may represent the second image and the second style, respectively. Additionally, the second camera may be any one of the cameras discussed thus far so long as it is different from the first camera. In some cases, the second camera is a low light camera structured to detect light spanning a second range of illuminance (e.g., between about 1 milli-lux and about 10 lux) such that the second image is a low light image. Additionally, the first style may be any of the styles listed earlier, and the second style may be any of the other styles listed earlier.

Figure 7A:
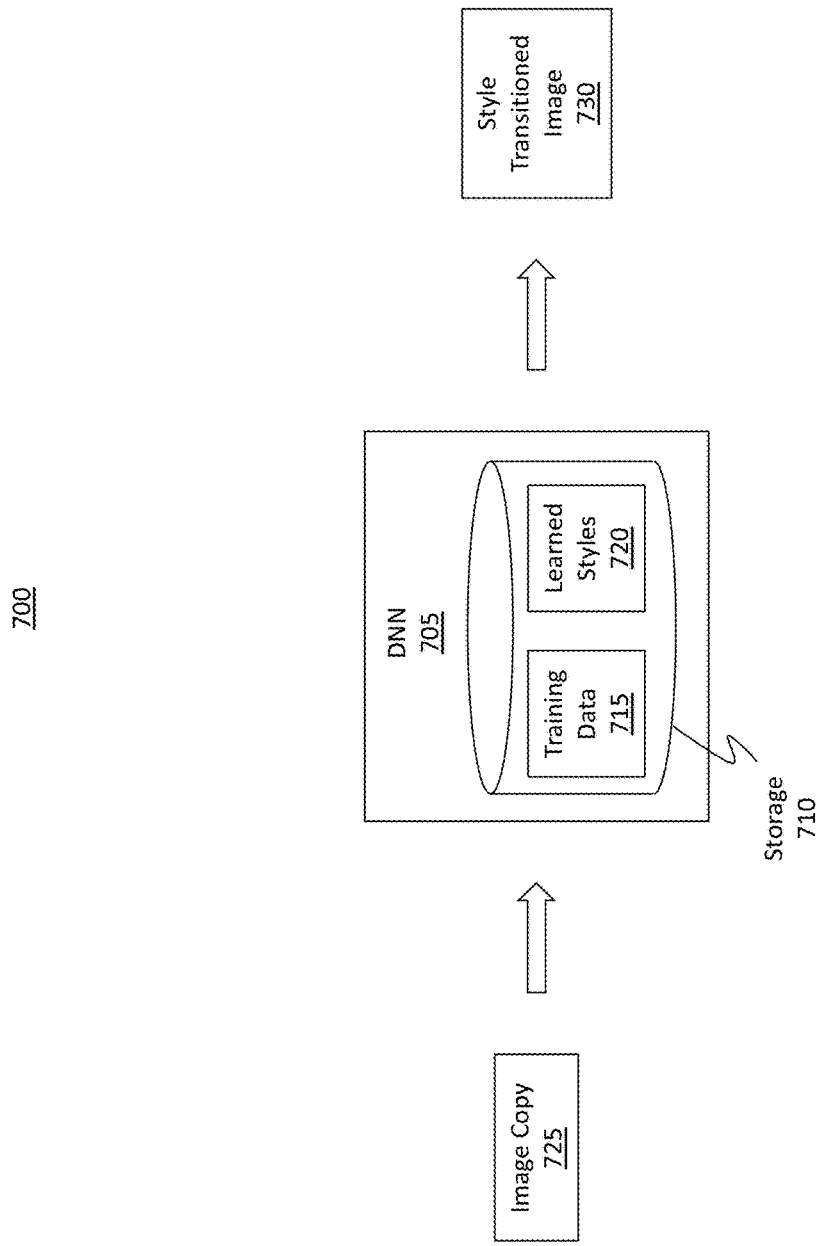
FIGS. 7A and 7B provide additional details regarding how the DNN is able to perform its style transitioning operations.

Subsequent to a deep neural network (DNN) (e.g., DNN 515) learning the first style and the second style, there is an act (act 615) of feeding a copy of the first image as input to the DNN. FIG. 7A is representative of such a process.

For instance, FIG. 7A shows a style transform process 700, which is representative of the style transforms discussed thus far. Here, there is a DNN 705, which is representative of the DNNs discussed thus far. DNN 705 has been trained to recognize and apply different styles. For instance, DNN 705 includes or is associated with a storage 710 comprising training data 715 used to train the DNN 705. From this training data 715, the DNN 705 has learned styles 720 (e.g., the visible light style 410, the low light style 415, and the thermal data style 420). FIG. 7A also shows an image copy 725, which is representative of the copy of the first image mentioned in act 615 and which may be a copy of any of the images discussed thus far (e.g., image 505 from FIG. 5). A copy of the image may be used to preserve the original image without modifying the original image. In some embodiments, preserving the original image may be irrelevant, and the original image may be used.

Returning to FIG. 6A, there is an act (act 620) of causing the DNN to modify the first image copy by transitioning the first image copy from being of the first style to subsequently being of the second style. As a consequence, a modified style of the transitioned first image copy bilaterally matches the second style. Use of the phrase "bilateral match" generally means that the characteristics, features, and editing operations of one image are associated with or related to the characteristics, features, and editing operations of another image. That is, the characteristics, features, and editing operations may not be exactly the same, but they may be sufficiently related (or related to a threshold amount) to ensure that the resulting styles of the two images correspond with one other.

Of course, the opposite operation may also be performed. For instance, a copy of the second image may be fed as input to the DNN. Then, the DNN can be caused to modify the second image copy by transitioning the second image copy from being of the second style to subsequently being of the first style such that a modified style of the transitioned second image copy bilaterally matches the first style.

As will be described further in FIG. 6B, the first image and the transitioned second image copy may constitute a first stereo pair of images of the first style. Additionally, the second image and the transitioned first image copy may constitute a second stereo pair of images of the second style. Parallax correction may be performed on the first image and on the transitioned first image copy to align perspectives of the first image and the transitioned first image copy with each other and potentially with a user's pupil. Additionally, the embodiments may perform parallax correction on the second image and on the transitioned second image copy to align perspectives of the second image and the transitioned second image copy with each other and with another one of the user's pupils.

FIG. 7A shows how the DNN 705 is able to receive as input the image copy 725 and perform a style transform on the image copy 725. The style transform transforms the style of image copy 725 into a new style, thereby creating a new image, as shown by style transitioned image 730. Style transitioned image 730 is representative of the transitioned image 535 from FIG. 5. The style transitioned image 730 has a style that corresponds with a style that the DNN 705 was instructed to transition the image copy 725 to.

Figure 7B:
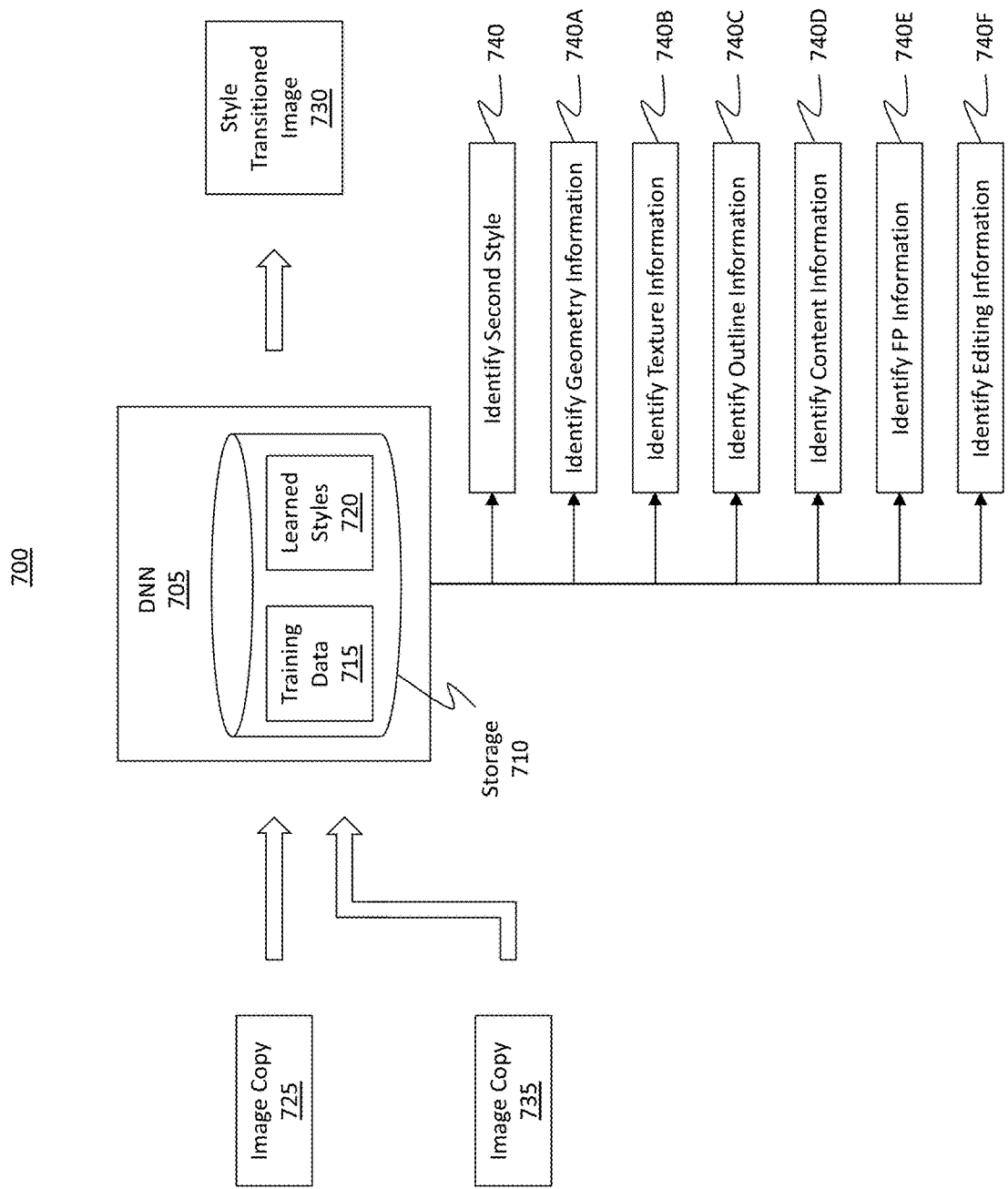

In some cases, as shown in FIG. 7B, the selected style of another image is concurrently fed in as input to the DNN 705. That is, in addition to the image copy 725, another image or image copy 735 may be concurrently fed into the DNN 705. The style of the image copy 735 is the style that the DNN 705 is to transition image copy 725 to.

Upon receiving the image copy 735, the DNN 705 is able to identify a second style (act 740), which style corresponds to the style of image copy 735. As indicated above, the DNN 705 is tasked with transitioning the style of image copy 725 to this second style. Additionally, the DNN 705 is able to identify geometry information (act 740A), identify texture information (act 740B), identify outline information (act 740C), identify content information (act 740D), identify feature point (FP) information (act 740E), and/or identify editing information (act 740F). These different types of information correspond to the information described in connection with FIG. 4.

Based on the above information, which is extracted or learned from the image copy 735, the DNN 705 is able to tune its initial learned data in order to more fully transition the style of image copy 725 into the style embodied within image copy 735. By "tune," it is meant that the DNN 705 is able to better identify specific features, characteristics, and editing operations that are to be performed on the image copy 725 during the style transition process to ensure that the new style sufficiently corresponds to the style of image copy 735 (i.e. to ensure that the correlation between the two styles satisfies a correlation threshold or a correlation requirement).

Accordingly, in some embodiments, a copy of a second image is also fed as input to the DNN 705. In response, the DNN 705 can then perform a number of operations. For instance, in response to receiving the second image copy and the first image copy as input, the DNN is able to identify the second style, which is embodied within the second image copy, by analyzing attributes of the second image copy. For instance, the DNN is able to identify geometry information based on a perspective captured by the second image copy, identify outlined information based on the perspective captured by the second image copy, identify texture information by analyzing texture captured by the second image, and so on. Based on the DNN identifying the second style from the attributes of the second image copy and based on (i) the geometry information, (ii) the outline information, (iii) the texture information, or any of the other information that is identified, the DNN then modifies the first image copy by transitioning the first image copy from being of the first style to subsequently being of the second style such that the modified style of the transitioned first image copy bilaterally matches the second style.

The DNN is able to receive two images of two different styles as input (e.g., a first input image of a first style and a second input image of a second style). In response to this input, the DNN is able to perform modifications and transitions to produce 2 output images. For instance, the first input image of the first style is transitioned into a first output image of the second style, and the second input image of the second style is transitioned into a second output image of the first style. Here, the DNN is able to perform these transitions.

Turning now to FIG. 6B, in some cases, method 600 may include some additional acts, as listed in FIG. 6B. Method 600 may include an act (act 625) of performing parallax correction on the first image and on the transitioned first image copy to align perspectives of the first image and the transitioned first image copy. As described in more detail earlier, the parallax correction includes performing depth calculations and then reprojecting a camera's perspective to a new perspective to align the new perspective with a perspective of a user's pupil. In some cases, they are additionally aligned with a same pupil of a user. By way of example, suppose camera 205 of FIG. 2 generated the first image. Because of the offsets 240 and 245, it is beneficial to perform parallax correction on the first image so that a perspective embodied within that first image aligns with a perspective of the pupil 230. Transitioned first image copy will also have a perspective corresponding to camera 205. As such, it is beneficial to perform parallax correction on the transitioned first image copy to align the perspective of the transitioned first image copy with the pupil 230. In doing so, the perspectives of both the first image and the transitioned first image copy are aligned with one another and are aligned with a pupil of the user.

Method 600 also optionally includes an act (act 630) of overlaying selected portions of the transitioned first image copy onto the first image to generate a composite image. Alternatively, portions of the first image may be overlaid onto the transitioned first image copy. Further detail on this feature will be discussed later in connection with FIGS. 12A and 12B. As a brief introduction, however, the embodiments are able to selectively extract one or more portions from one image and overlay those portions onto another image. For instance, if the first style is the visible light style and the second style is the thermal data style, then the transitioned first image copy includes thermal data such that at least some of the thermal data is overlaid onto the first image and such that the composite image includes visible light data and at least some of the thermal data. One will appreciate how the images and styles may be any of the image types or style types mentioned earlier (e.g., the first image may be a low light image and may include low light data, etc.). When transitioned to another style, that image will then include data of another style type (e.g., as a result of the transition, the transitioned first image copy may include thermal data). As another example, thermal data may be overlaid onto a visible light image or a low light image. Subsequently, that composite image may be displayed on a display of the HMD (act 635).

In some cases, the second image discussed in method 600 and the transitioned first image copy constitute a stereo pair of images of the second style. Because these two images are taken from different perspectives and because these two images will capture at least some overlapping content (i.e. the fields of view captured by these two images at least partially overlaps), these two images can then be used to perform stereo depth matching.

Warping Images in Preparation for Overlaying Image Content

Figure 8A:
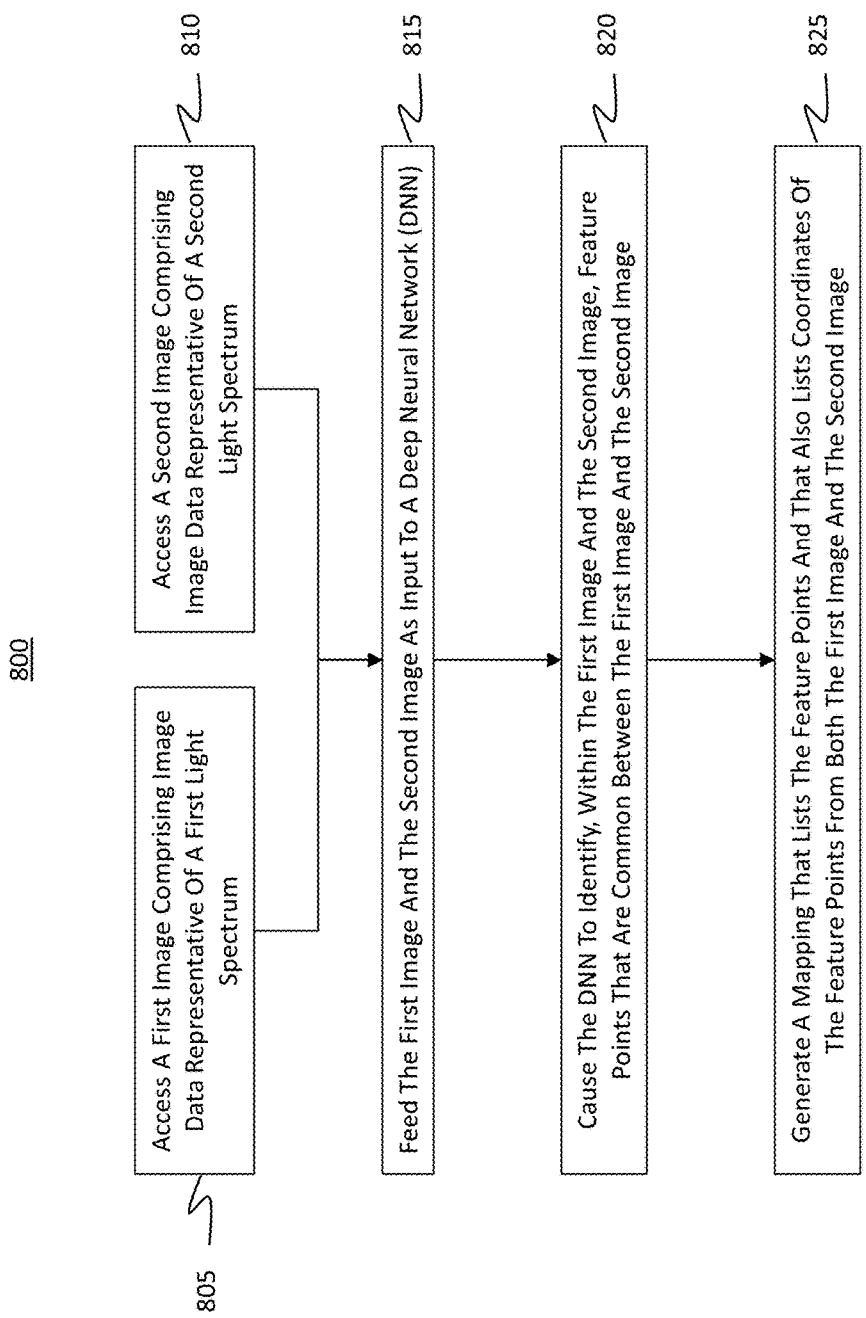
FIGS. 8A and 8B illustrate a flowchart of an example method for identifying corresponding feature points in images that capture the same environment but that have different styles.
Figure 8B:
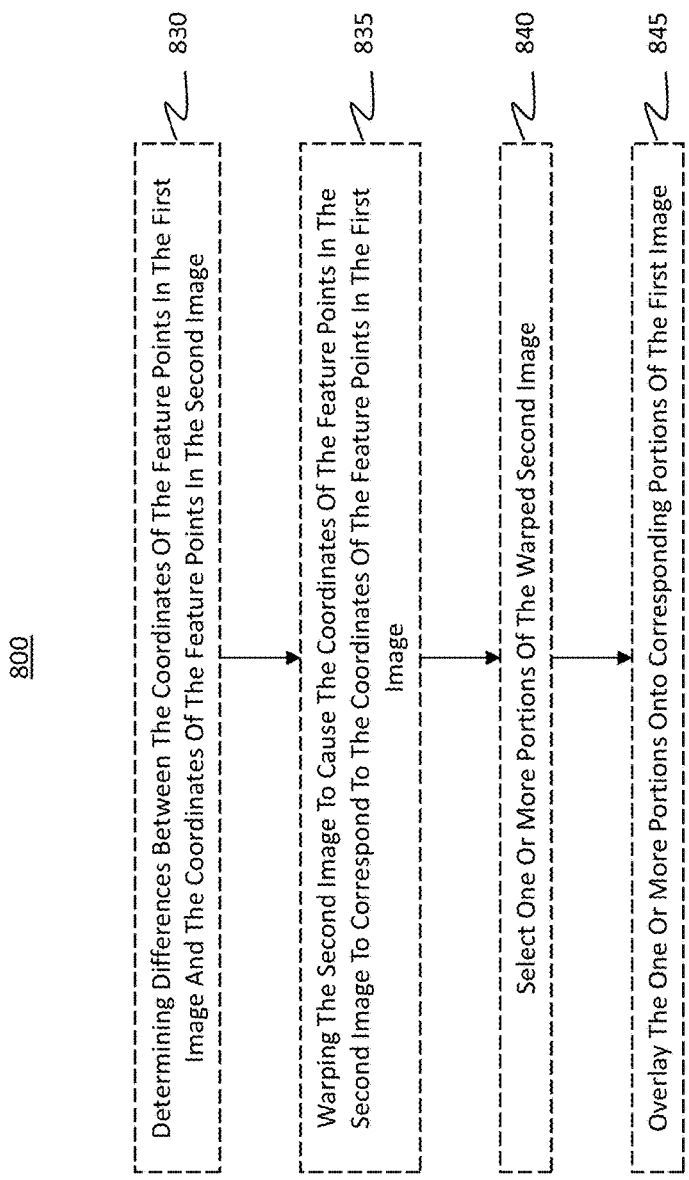

As discussed above, some embodiments are structured or configured to overlay content from one image onto another image to form a so-called composite image, which may then be displayed to a user. FIGS. 8A and 8B illustrate a flowchart of an example method 800 for mapping common features between images that commonly represent an environment, where the images use different light spectrum data, in order to accurately align or overlay content between the two images.

Method 800 includes an act (act 805) of accessing a first image comprising image data representative of a first light spectrum. The first image may be any of the types discussed herein, and the light spectrum may be within any of the ranges discussed herein (e.g., any of the light spectrum(s) 135 mentioned in FIG. 1). Additionally, method 800 includes an act (act 810) of accessing a second image comprising image data representative of a second light spectrum. Acts 805 and 810 may be performed serially or in parallel with one another. The spectrums may be any of the spectrums mentioned earlier, including a visible light spectrum, a visible light and infrared light spectrum, or even a long wave infrared spectrum.

As an example, FIG. 9 shows a warped LL image 900, which may be representative of the first image in act 805, and a thermal image 905, which may be representative of the second image in act 810. Warped LL image 900 is labeled as being "warped" because one or more transforms have already been applied to it. For instance, parallax corrections may have been applied to the image to ensure that a perspective of the warped LL image 900 aligns with a perspective of the user's pupil (i.e. warped LL image 900 may be a parallax corrected image). In contrast, transformations have not been applied to the thermal image 905. Comparing the two figures, one can identify how the thermal image 905 is smaller and more skewed than the warped LL image 900. Because of these differences in characteristics, if content from the thermal image 905 were attempted to be overlaid onto the warped LL image 900, then the content would be misaligned and the resulting composite image would appear to be a low-quality image. In some cases, the two images may have the same perspectives while in other instances the perspectives are not yet aligned.

Figure 10:
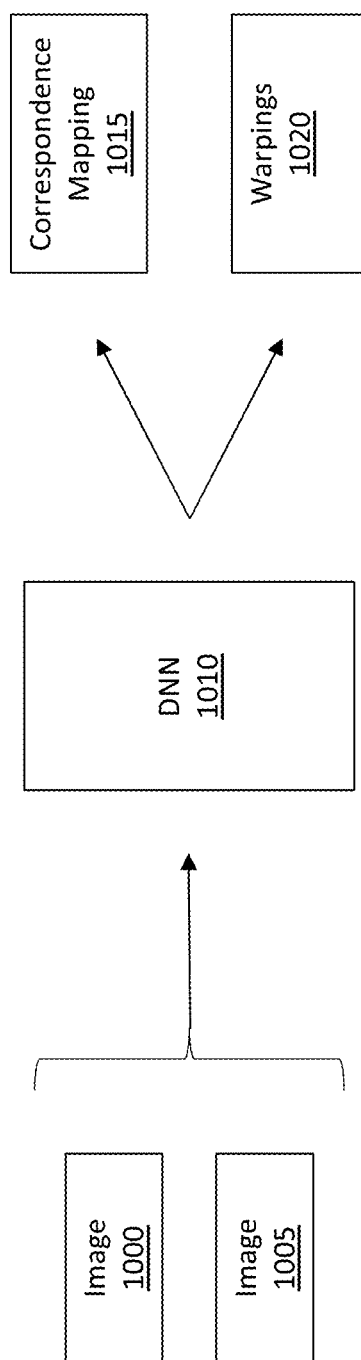
FIG. 10 illustrates how a DNN (or perhaps a thermal imager) is able to analyze two differently styled images to identify corresponding feature points as between those two images.

With that understanding, method 800 of FIG. 8A then includes an act (act 815) of feeding the first image and the second image as input to a deep neural network (DNN). For instance, FIG. 10 shows a first image 1000 and a second image 1005 being fed as input into a DNN 1010. The first image 1000, the second image 1005, and the DNN 1010 are representative of the images and DNNs discussed thus far, including those discussed in method 800.

Returning to FIG. 8A, the DNN then identifies (act 820), within the first image and the second image, feature points that are common between the first image and the second image. As an example, suppose the first image is a low light image and the second image is a thermal image. In this case, the DNN is able to identify the feature points even though the low light image represents an environment using low light data and the thermal image represents the environment using thermal data. In some embodiments, the DNN may be required to identify a selected number or threshold number of the feature points prior to continuing with the method (e.g., prior to any warping operation being performed on the second image).

Figure 11A:
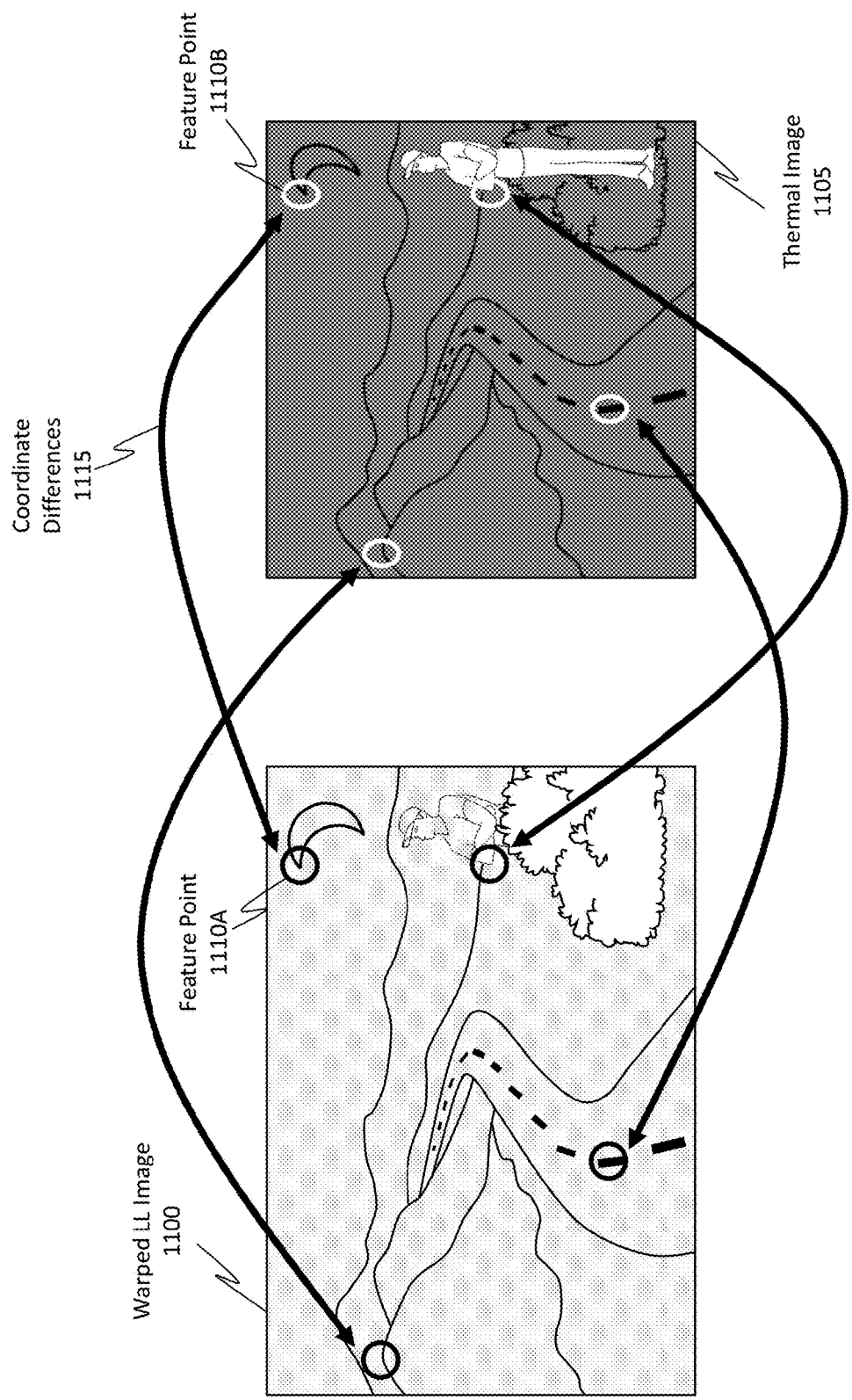
FIGS. 11A and 11B illustrate how the DNN is able to perform a two-dimensional (2D) warp on an image to align the feature points within that image with corresponding feature points of a differently styled image, which has a substantially similar perspective as the original image.

FIG. 11A provides a useful illustration of this method act. In particular, FIG. 11A shows a warped LL image 1100, which is representative of the first image in method 800, and a thermal image 1105, which is representative of the second image. FIG. 11A also shows how the DNN identified corresponding feature points between the two images, such as feature point 1110A (i.e. the tip of the crescent moon) and feature point 1110B. That is, even though warped LL image 1100 and the thermal image 1105 included different types of data (e.g., low light data versus thermal data), the DNN is able to analyze the characteristics of the two images and identify feature points within those two images that commonly represent the same object or feature. In some cases, the DNN may also assign a probability metric to its determination, where the probability metric indicates a likelihood of correlation or a degree of correlation as between the two points.

Returning to FIG. 8A, a mapping is then generated (act 825), where the mapping lists the feature points and also lists coordinates of the feature points from both the first image and the second image. FIG. 10 shows how the DNN 1010 is able to generate a correspondence mapping 1015. Additionally, as shown in FIG. 11A, the DNN is able to identify coordinate differences 1115 as between the two images. That is, the feature point 1110A is located at a specific set of pixel coordinates within the warped LL image 1100. Similarly, the feature point 1110B is located at a specific set of pixel coordinates within the thermal image 1105. Because of the differences in size, geometry, or potentially perspective of the two images, the coordinates are likely to be different. The DNN is able to identify these differences, as shown by the coordinate differences 1115. In some cases, the differences between the feature points' coordinates in the first image and the feature points' coordinates in the second image occur as a result of a parallax correction that was performed on the first image.

Additionally, the DNN 1010 is able to identify differences between characteristics of the two images. These differences at least reflect any different warpings 1020 that may have been performed on the warped LL image 900 (i.e. any warpings or transforms performed to correct for parallax). As indicated earlier, the warpings 1020 include, but are not limited to, skewing, rotations, translations, and so forth.

The method acts described in FIG. 8B are examples of some additional operations that may potentially (though not necessarily) be performed. For instance, the embodiments are also able to determine (act 830) differences between the coordinates of the feature points in the first image and the coordinates of the feature points in the second image. The coordinate differences 1115 in FIG. 11A are representative of these differences. Stated differently, for a particular feature point included among any number of feature points, the embodiments are able to determine a difference between the feature point's coordinates in a first image and the feature point's coordinates in a second image.

Then, method 800 may include an act (act 835) of warping the second image to cause the coordinates of the feature points in the second image to correspond to the coordinates of the feature points in the first image. In some cases, the DNN warps the image while in other cases the image is warped by the processor or another thread of the HMD or computer system.

The embodiments are able to warp the second (or first) image to cause the feature point's coordinates in that image to correspond to the feature point's coordinates in another image. Warping the second image may include performing any of the following operations on the second image: a stretch operation, a shrink operation, a skew operation, a rotation operation, a translation operation, or a scaling operation.

Additionally, the embodiments are able to display a composite image comprising selected portions of the warped second image overlaid on top of corresponding portions of the first image. By way of example, the second image may be a low light image or a thermal image. The embodiments are able to analyze the second image to identify bright areas and/or thermally "hot" areas (or perhaps cold areas). These identified areas may be selected, extracted, and then overlaid onto corresponding portions of the first image. In this regard, bright areas identified within the low light image and/or "hot" or "cold" areas (or heat signatures) identified in the thermal image may be specifically overlaid onto another type of image so as to provide an enhanced image. Similarly, selected bright areas from a low light image or selected content from a visible light image may be overlaid onto a thermal image. In some cases, only image content satisfying a brightness threshold, a hot threshold, or a cold threshold is selected for overlay onto another image. Additionally, or alternatively, the embodiments are able to show where there is low light texture but no thermal texture, and vice versa.

In some cases, to improve the warping process, the embodiments may additionally feed a third image to the DNN. This third image may correspond to the first image (which may have already had a parallax correction performed on it), but the third image may not yet have had any parallax corrections (i.e. the third image corresponds to the raw version of the first image prior to the first image being subjected to parallax correction). With these inputs, the DNN is able to identify changes made to the feature points of the first image during the parallax correction operation and can then apply related changes to the feature points in the second image (i.e. the DNN identifies the changes made between the raw version of the first image and the first image and then apply similar changes to the second image).

Figure 11B:
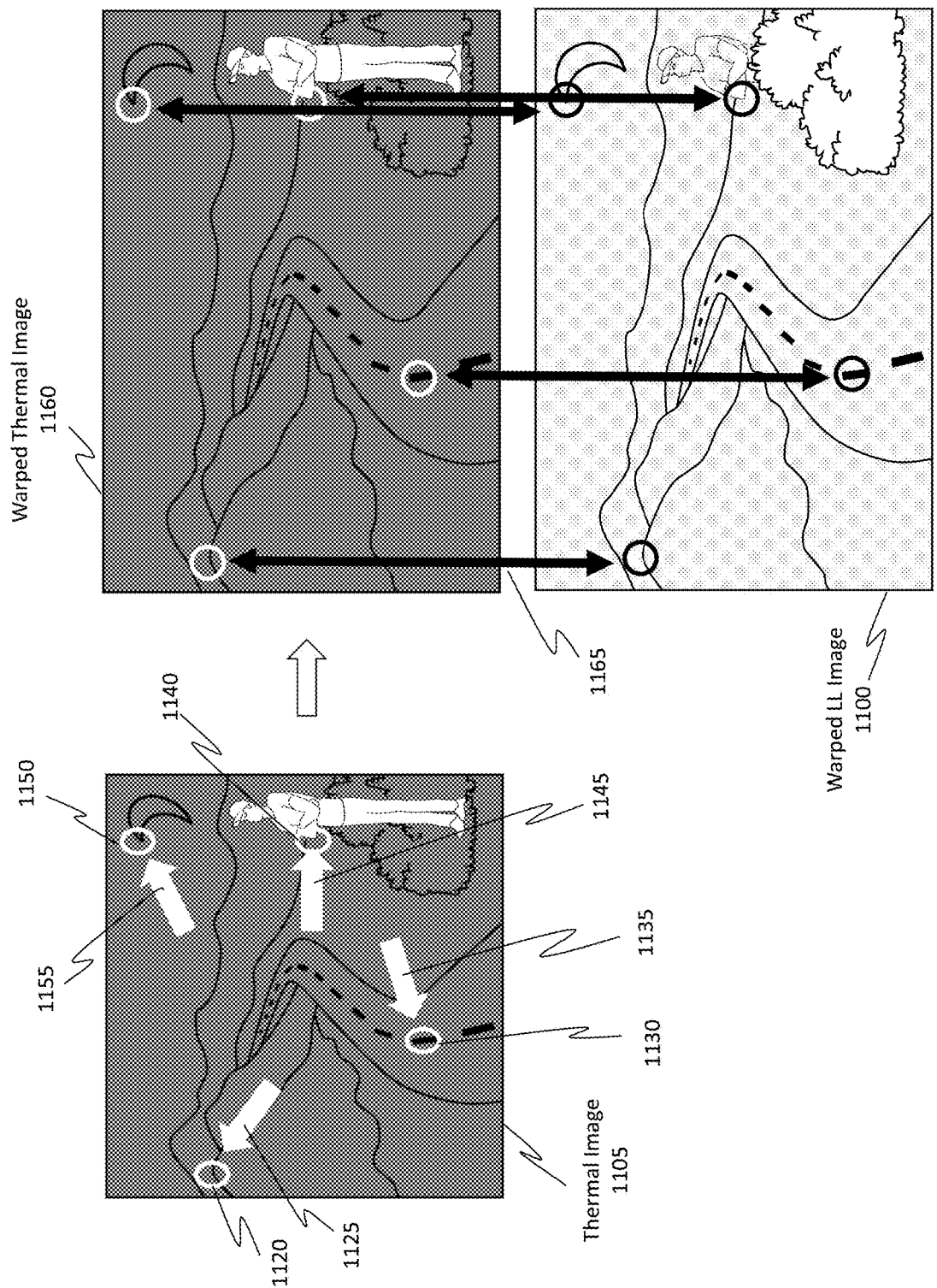

FIG. 11B shows both the warped LL image 1100 and the thermal image 1105. Any number of corresponding features points have been identified within those two images. In FIG. 11B, four common feature points have been identified, but one will appreciate how any number of feature points will be identified (e.g., 5, 6, 7, 8, 9, 10, 20, 30, 40, 50, 60, 70, 80, 90, 100, 200, 300, 400, 500, 1,000, or more than 1,000). The embodiments then warp the feature points so the positioning of the feature points, or rather the coordinates, align with one another as between the two images.

For instance, feature point 1120 is being warped 1125 to be pushed leftward and upward. Feature point 1130 is being warped 1135 to be pushed leftward and downward. Feature point 1140 is being warped 1145 to be pushed rightward. Feature point 1150 is being warped 1155 to be pushed upward and rightward. These warpings are two-dimensional warpings or operations, not three-dimensional geometric warpings (like the parallax corrections, which rely on depth).

To clarify, in some embodiments, the mapping discussed earlier may be used to warp a 2D alignment of the second image to match a 2D alignment of the first image. As a consequence, a three-dimensional (3D) reprojection is prevented from being performed when the warp is performed such that the warp is actually a two-dimensional (2D) modification of the second image. In some cases, the warping may be required to be performed on at least a selected number or a threshold number of feature points.

As a result of performing these warping operations on any number of feature points, the warped thermal image 1160 is generated, where this warped thermal image 1160 corresponds or is aligned with the warped LL image 1100. For instance, as shown by correspondence 1165, the feature point of the mountain in the warped thermal image 1160 is located at a same pixel coordinate as the mountain in the warped LL image 1100. The other correspondence arrows signify other correlations between pixel coordinates.

Figure 12A:
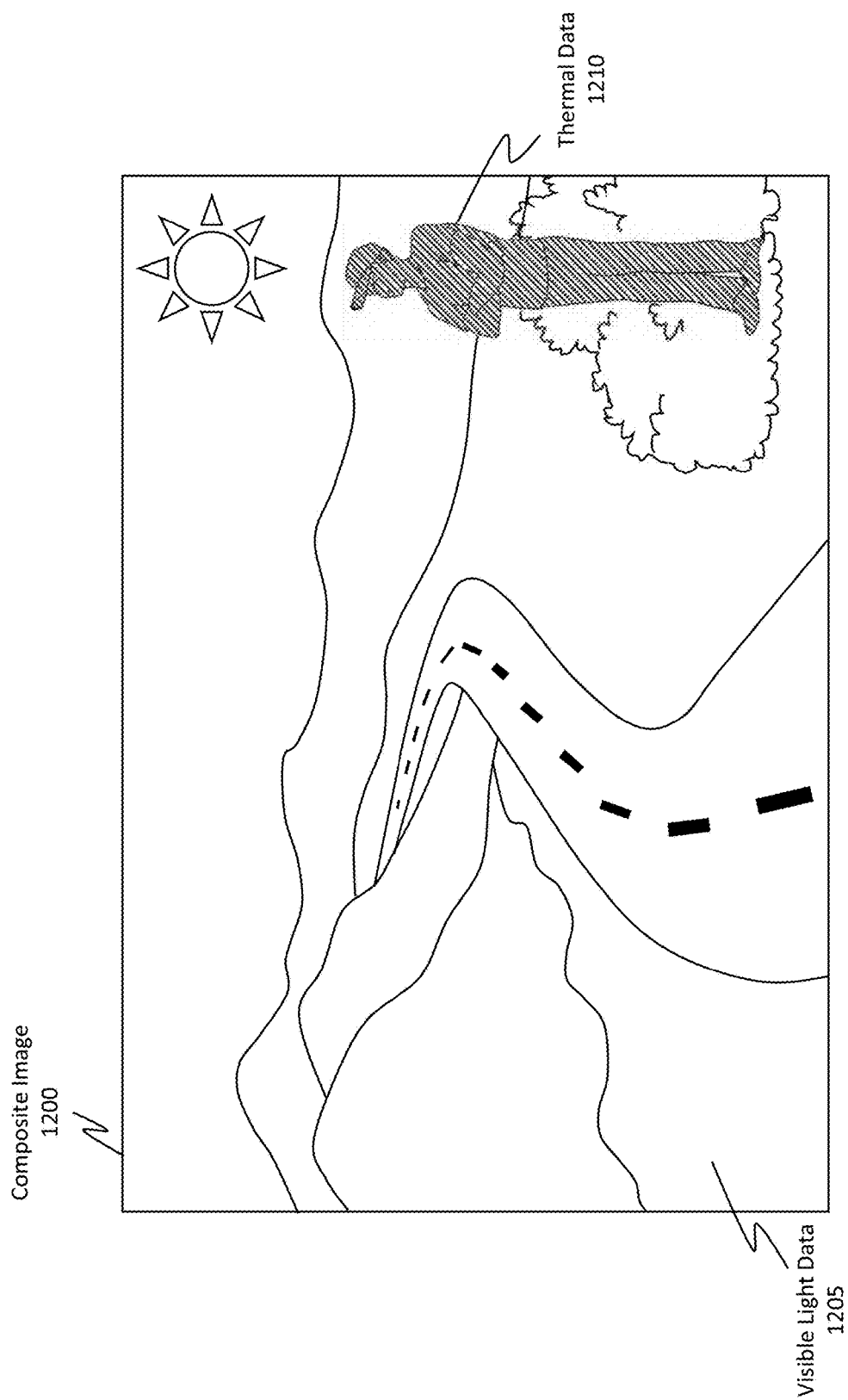
FIGS. 12A and 12B illustrate how, as a result of the warping processes, content from one image can now be overlaid directly onto a differently styled image and how the overlaid content will be aligned even though the two styles are unique.
Figure 12B:
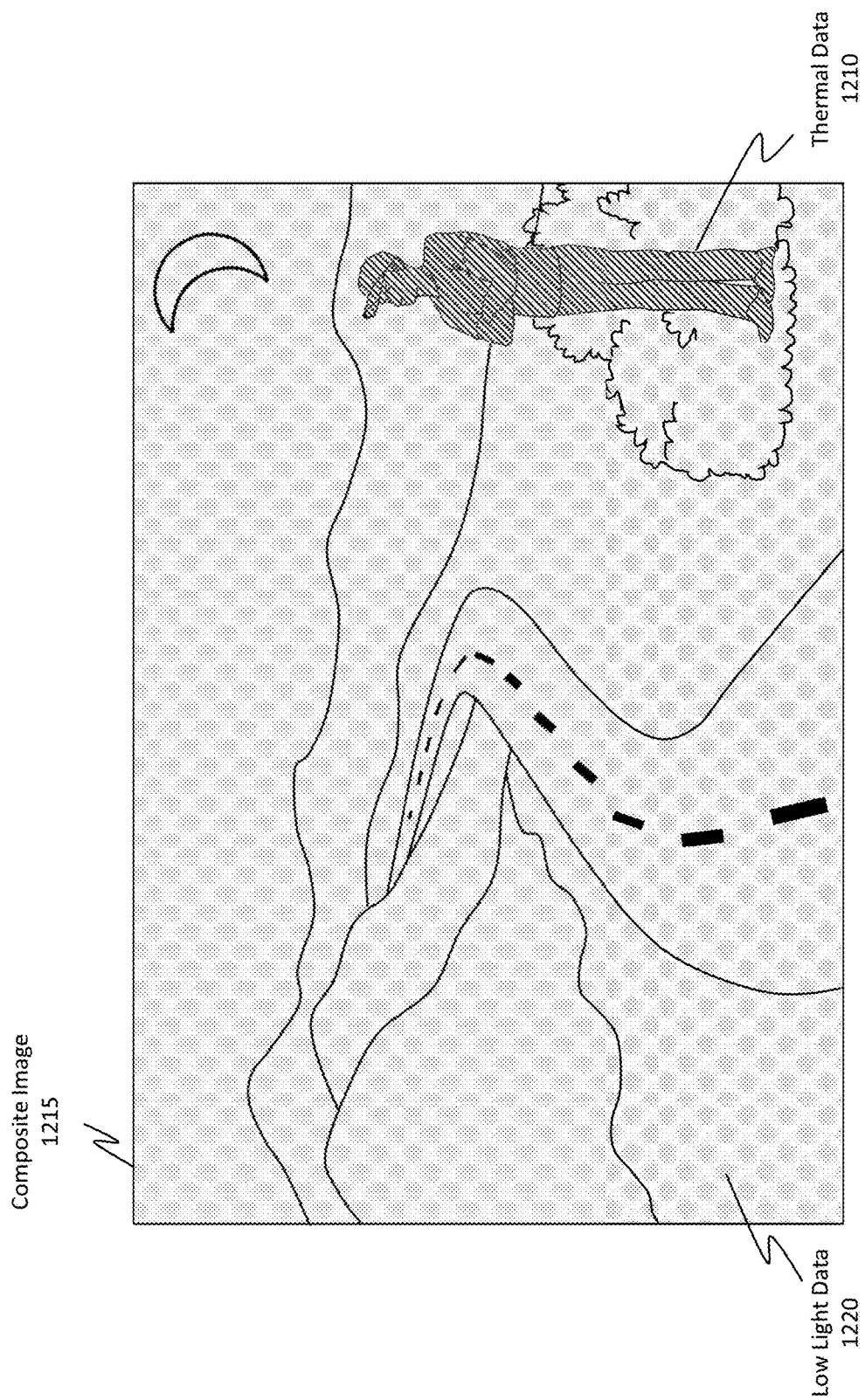

Now that the warped thermal image 1160 is aligned (pixel-wise) with the warped LL image 1100, some embodiments then select one or more portions of the warped second image (e.g., act 840 in FIG. 8B) and overlay those portions onto corresponding portions of the first image (e.g., act 845 in FIG. 8B). FIGS. 12A and 12B are representative. To clarify, subsequent to the second image being warped, some embodiments then select one or more portions of the warped second image to be overlaid onto the first image.

In FIG. 12A, there is a composite image 1200 comprising visible light data 1205 and thermal data 1210. Here, a thermal image was previously warped in the manner described earlier so as to align pixel coordinates of the thermal image with a visible light image. A selected portion of the thermal image, for example the person shown by the thermal data 1210, was then overlaid onto a corresponding area or portion of the visible light image. For instance, as discussed with some of the earlier examples, a person was standing behind the bush in the visible light image. The person's legs were not visible through the bush in the visible light RGB images. By overlaying the thermal data 1210 onto the visible light data 1205, the composite image 1200 illustrates how the thermal data 1210 can be used to enhance the visible light data 1205 to view subject matter than may not have been observable in the visible light spectrum.

FIG. 12B shows another composite image 1215 comprising low light data 1220 and the thermal data 1210. Similar to the scenario shown in FIG. 12A, the thermal data 1210 may be used to enhance the low light data 1220. Other alternatives are possible as well. For instance, visible light data may be overlaid onto thermal or low light data, and low light data may be overlaid onto visible light or thermal data.

Figure 13:
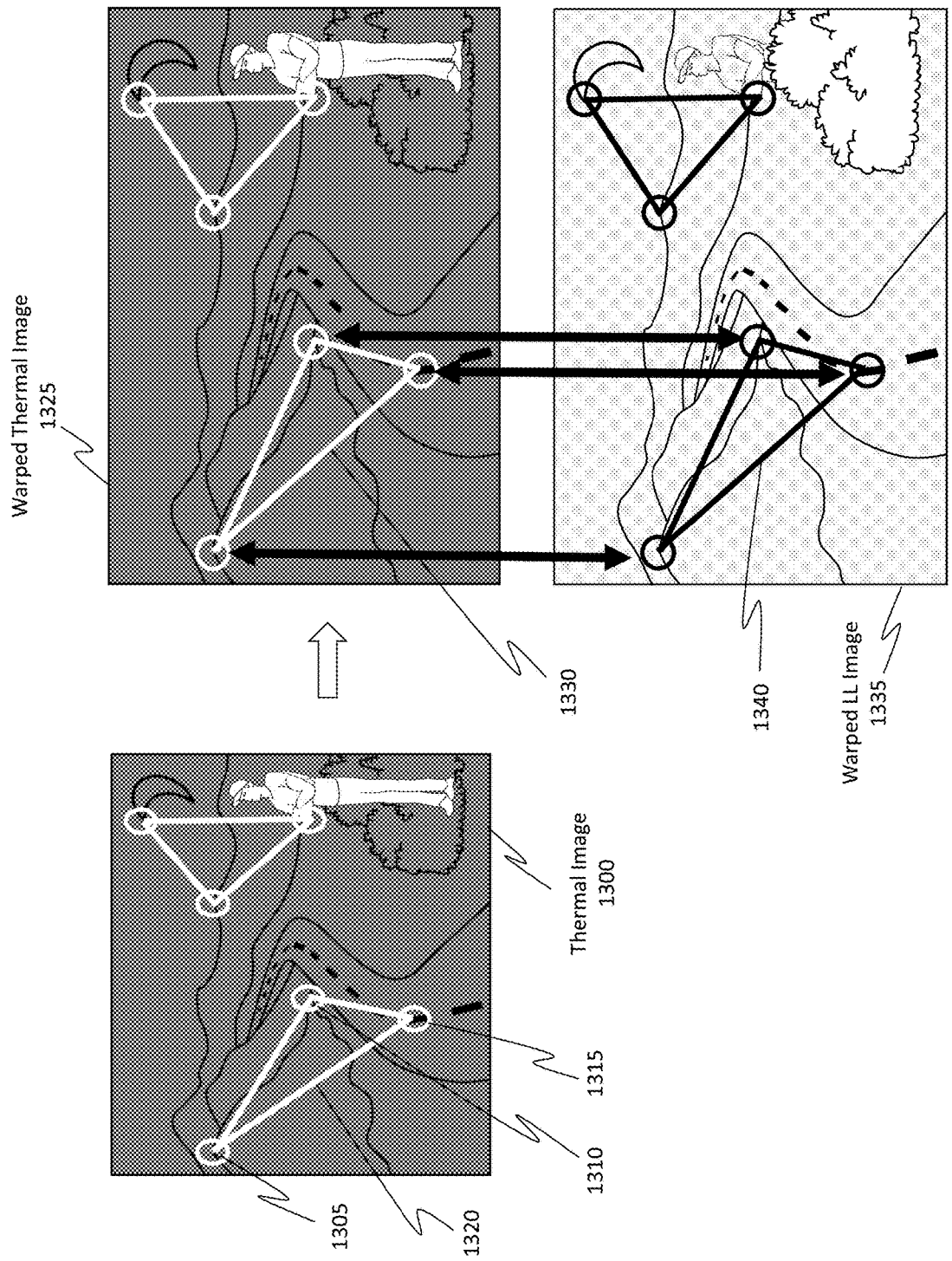
FIG. 13 illustrates an example technique for ensuring that at least a majority of points or pixels in an image are properly warped for alignment purposes.

While the embodiments may be able to identify hundreds, thousands, or any number of corresponding feature points between two images, there may be a case where pixels are not associated or attached to a feature point. If the 2D warping process mentioned earlier were performed, then the warping process may result in a scenario in which the remaining pixels are not properly aligned. FIG. 13 presents a solution to this potential problem, where the solution entails grouping clusters or groups of pixels together and then performing the 2D warping process on the entire cluster of pixels.

For example, FIG. 13 shows a thermal image 1300, which is representative of the thermal images discussed earlier. Thermal image 1300 includes feature points 1305, 1310, and 1315. These feature points are anchor points or recognizable points that are common between the thermal image 1300 and another image. For pixels that are not attached or otherwise associated with the feature points, the embodiments are able to group pixels together. FIG. 13 shows how a group 1320 of pixels are clustered together. In this case, the group 1320 is defined by a triangle, where the feature points 1305, 1310, and 1315 define the three points of the triangle. The group 1320 includes the pixels that are included within the boundary defined by the triangle.

Of course, other polygons or shapes may be used or defined using any number of feature points as vertices. More generally, the feature points may be used to define different polygons in the different images. Related changes are then performed on the pixels or points in each polygon to ensure that these other pixels or points (e.g., besides just the feature points) in the second image are also changed.

In this manner, pixels included within the group 1320 may be warped as a combined unit and in a similar manner. Other groupings may be warped in a different manner. In some cases, the smaller the groupings, the more accurate the resulting warping process will be. As such, some embodiments impose a threshold limit on the number of pixels or on the size of the image that may be included within a particular group. In some embodiments, it may not be necessary to ensure that all pixels in an image are warped. Instead, these embodiments may impose a requirement that at least some percentage of the overall number of pixels are warped or that at least some percentage of the overall size of the image is warped without necessarily requiring the entirety of the pixels or the image to be warped.

FIG. 13 shows how, after performing the warping processes on the thermal image 1300, the warped thermal image 1325 is produced. The grouping 1320 is still present in the warped thermal image 1325, as shown by grouping 1330. Furthermore, as a result of performing the warping, the warped thermal image 1325 is now aligned (pixel-wise and in a 2D manner) with the warped LL image 1335. For instance, the grouping 1330 now aligns with the grouping 1340 found in warped LL image 1335, where the grouping 1340 is defined using the same vertices or feature points as in the thermal image 1300 and the warped thermal image 1325. Accordingly, some embodiments selectively group multiple feature points and multiple other pixels together to form a cluster or a group, and then the embodiments apply a common warping operation to that group.

Training the DNN

Figure 14:
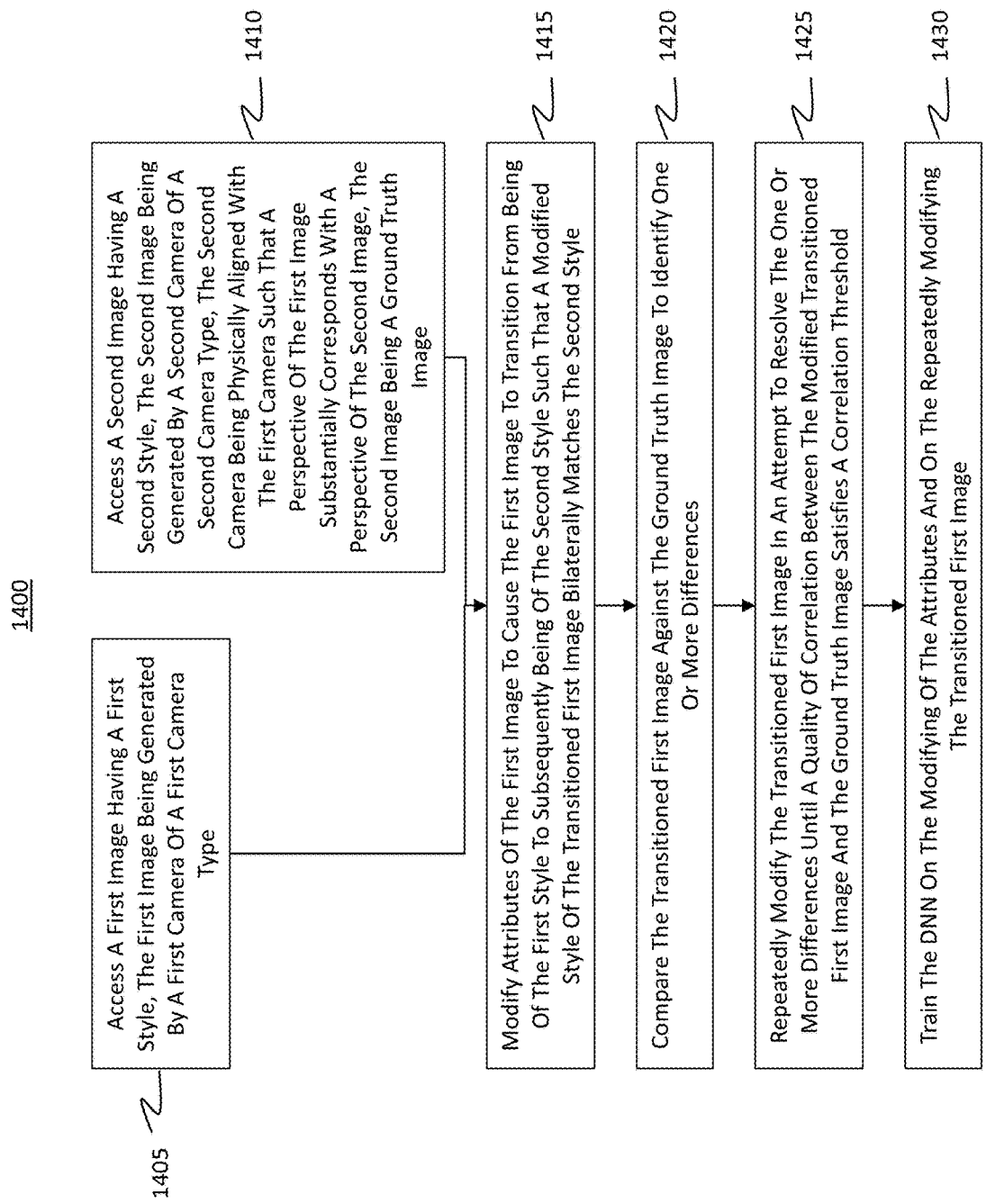
FIG. 14 illustrates a flowchart of an example method for training a DNN on different image styles and for applying the trained or learned knowledge to subsequently warp differently styled images for alignment purposes.

FIGS. 14, 15A, 15B, and 15C illustrate an example technique for training the DNN to perform the operations disclosed herein. In particular, FIG. 14 illustrates a flowchart of an example method (1400) of training a deep neural network (DNN) to recognize styles of images captured by different types of cameras. Method 1400 comprises training the DNN by performing at least the operations disclosed in FIG. 14.

Method 1400 is shown as including an act (act 1405) of accessing a first image having a first style, where the first image is generated by a first camera of a first camera type. As an example, the first camera may be any of the camera types mentioned herein (e.g., a visible light, a low light camera, or a thermal imaging camera).

Figure 15A:
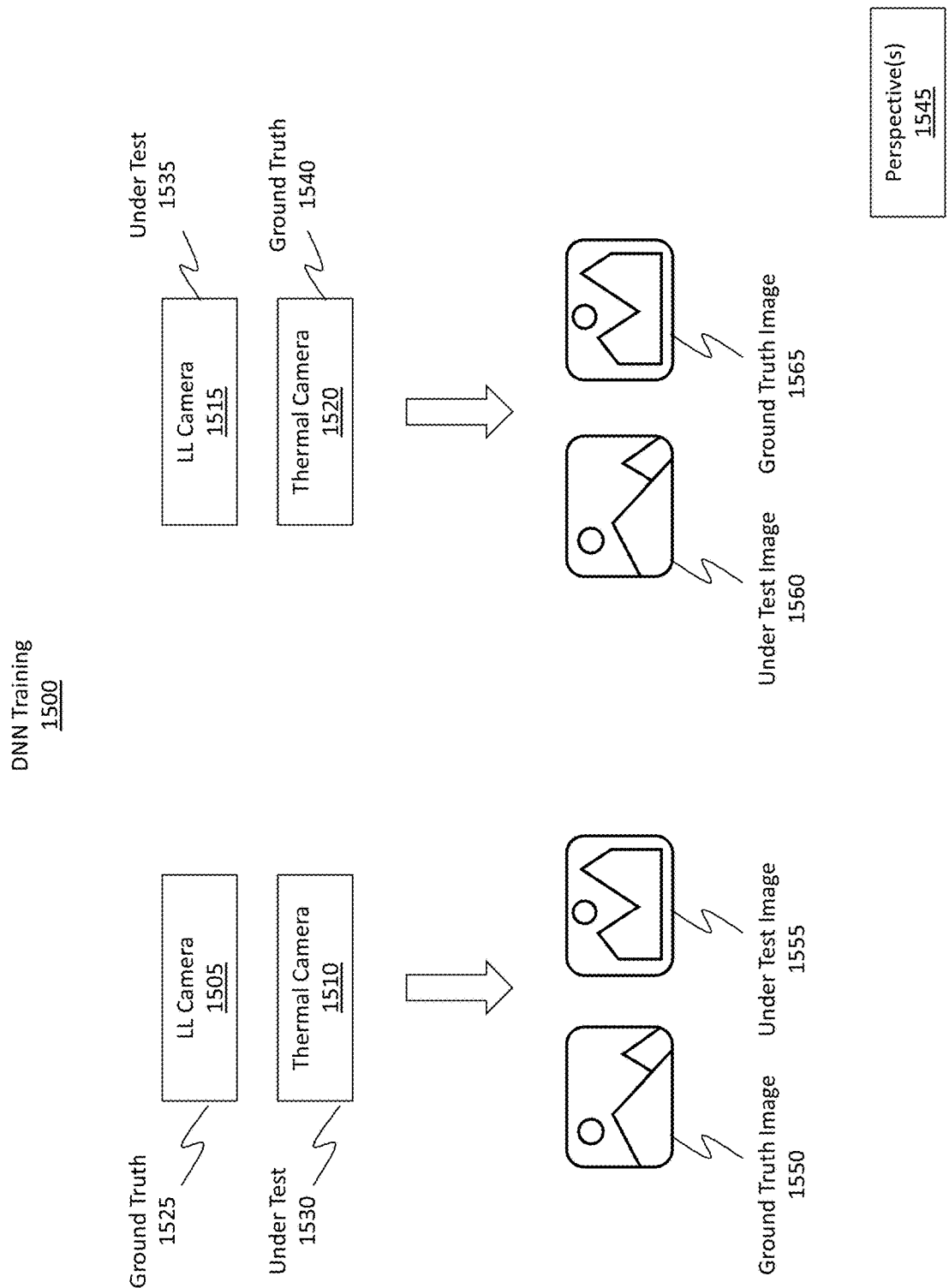
FIGS. 15A, 15B, and 15C illustrate another flowchart of training a DNN to align differently styled images.

Either in parallel or in serial with act 1405, there is an act (act 1410) of accessing a second image having a second style. Here, the second image is generated by a second camera of a second camera type (e.g., a different one of the visible light camera, the low light camera, or the thermal imaging camera). Notably, the second camera is physically aligned with the first camera such that a perspective of the first image substantially corresponds with a perspective of the second image. For example, the second camera may be disposed immediately on top of or to the side of the first camera such that there exists only a slight or minor difference in their perspectives, which difference may be corrected by performing the disclosed parallax correction. Additionally, the second image constitutes or is classified as a ground truth image. FIG. 15A is representative.

FIG. 15A shows an example DNN training process 1500 in which a LL camera 1505, a thermal camera 1510, another LL camera 1515, and another thermal camera 1520 are provided. Of course, other combinations of cameras may be used (e.g., visible light cameras, LL cameras, thermal cameras, etc.). LL camera 1505 is considered to be a ground truth 1525, thermal camera 1510 is considered to be under test 1530, LL camera 1515 is considered to be under test 1535, and thermal camera 1520 is considered to be a ground truth 1540.

Notice, the LL camera 1505 and the thermal camera 1510 are physically aligned such that the perspective(s) 1545 of those two cameras substantially align with one another. Similarly, the LL camera 1515 and the thermal camera 1520 are physically aligned such that the perspective(s) 1545 of those two cameras substantially align with one another. As a result of these alignments or matching perspective(s) 1545, the LL camera 1505 operates as the ground truth 1525 for at least images generated by the thermal camera 1510, and the thermal camera 1520 operates as the ground truth 1540 for at least images generated by the LL camera 1515.

The LL camera 1505 generates a ground truth image 1550; the thermal camera 1510 generates an under test image 1555; the LL camera 1515 generates an under test image 1560; and the thermal camera 1520 generates a ground truth image 1565. Each of these images has styles corresponding to the type of camera that generated them (e.g., in this example, the under test image 1555 has a thermal data style and the ground truth image 1550 has a low light style). In some cases, a depth computation may be performed to more fully align (e.g., by performing parallax correction) the ground truth image 1550 (i.e. a "first" image) with the under test image 1555 (i.e. a "second" image), or vice versa, so the perspective of the first image substantially corresponds with the perspective of the second image.

Figure 15B:
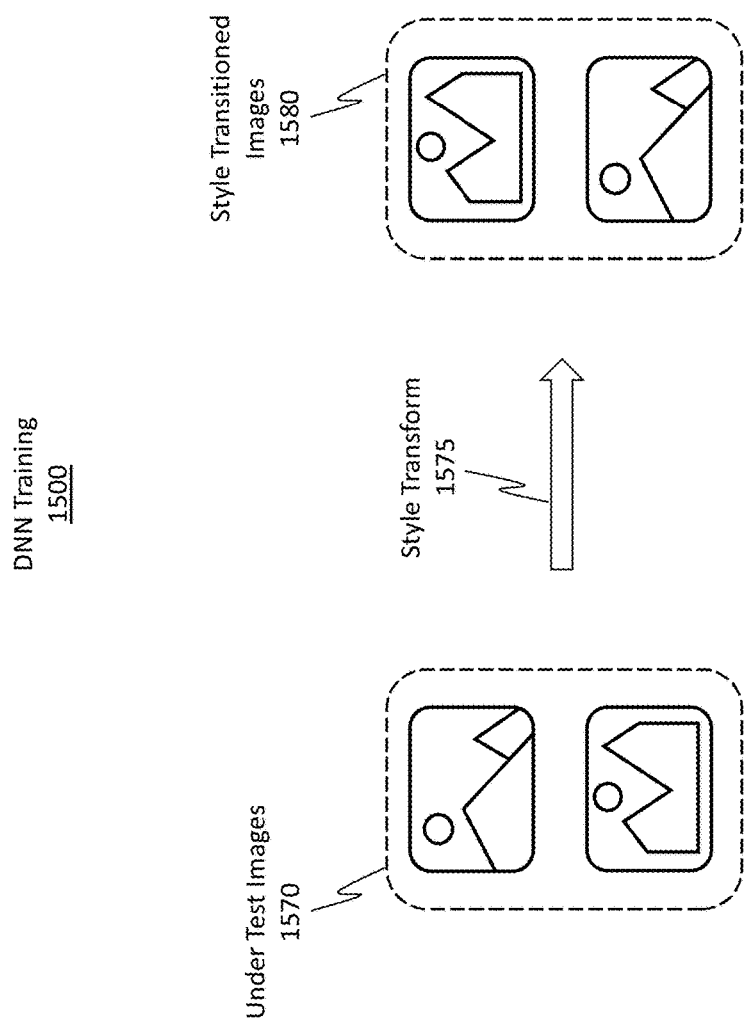

Returning to FIG. 14, method 1400 includes an act (act 1415) of modifying attributes of the first image to cause the first image to transition from being of the first style to subsequently being of the second style such that a modified style of the transitioned first image bilaterally matches the second style. Such a process was described earlier in this disclosure. FIG. 15B illustrates how the under test images 1570 (i.e. the under test image 1555 and/or the under test image 1560) are subjected to a style transform 1575 to generate style transitioned images 1580.

By way of example, the under test image 1555 originally has a thermal data style. As a result of the style transform 1575, the resulting new image included in the style transitioned images 1580 now has a low light style.

Returning to FIG. 14, method 1400 includes an act (act 1420) of comparing the transitioned first image against the ground truth image to identify one or more differences. For interest, one of the style transitioned images 1580 in FIG. 15B has the same perspective as the under test image 1555 (e.g., the under test image 1555 was style transformed to generate the style transitioned image). Now, there are three images with substantially the same perspective; namely, the ground truth image 1550, the under test image 1555, and one of the style transitioned images 1580. Similarly, the under test image 1560, the ground truth image 1565, and the other one of the style transitioned images 1580 also have substantially the same perspective.

For the first group of related images (i.e. 1550, 1555, and 1580), the embodiments are able to compare the style transitioned image, which now has a programmatically generated low light style (whereas it previously had a thermal data style), against the ground truth image 1550, which has a true or "ground truth" low light style. Based on this comparison, the embodiments are able to identify any differences between the true (i.e. ground truth) low light style and the programmatically generated or inferred low light style. Similar operations may be performed for the under test image 1560, the ground truth image 1565, and the other one of the style transitioned images 1580.

Figure 15C:
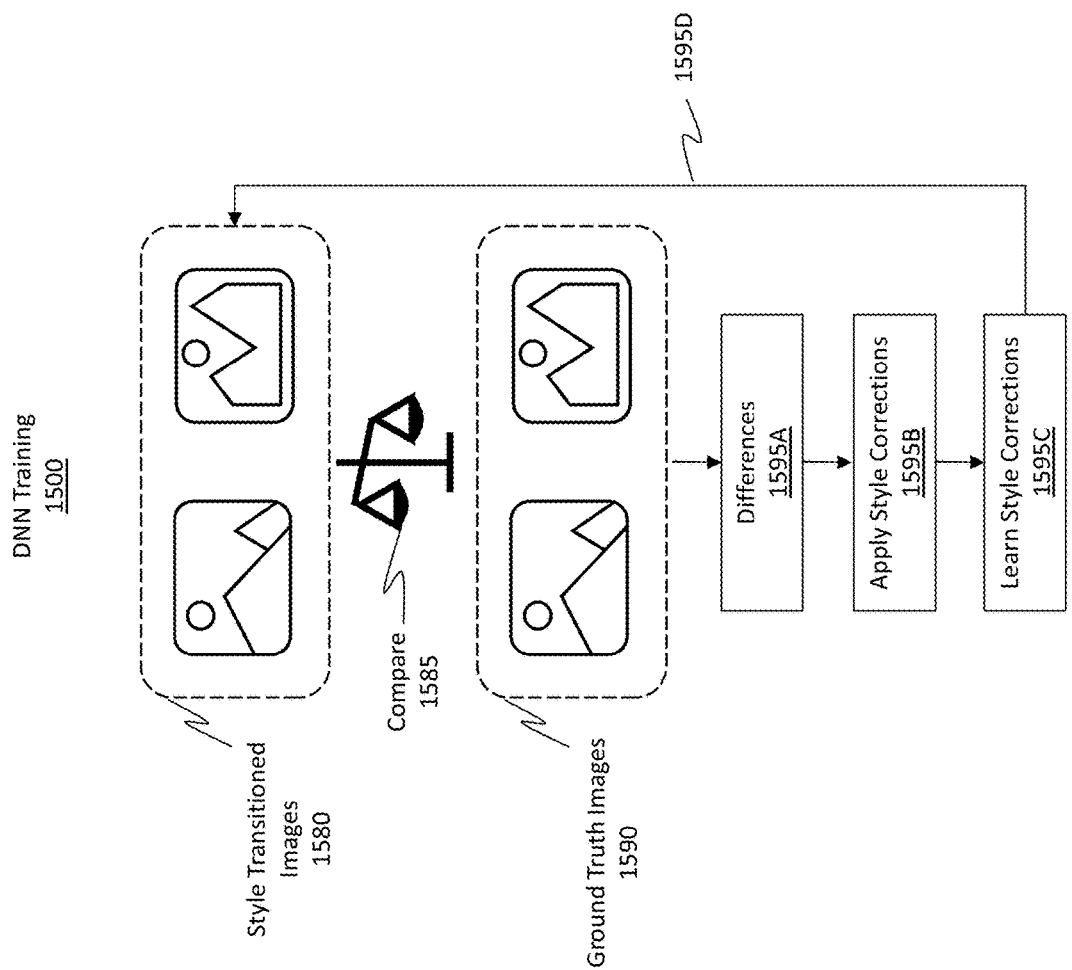

FIG. 15C shows how the style transitioned images 1580 may be compared 1585 against the ground truth images 1590 (comprising ground truth images 1550 and 1565). As a result of this comparison, the embodiments may identify one or more differences 1595A.

Returning to FIG. 14, method 1400 includes an act (act 1425) of repeatedly modifying the transitioned first image in an attempt to resolve the one or more differences until a quality of correlation between the modified transitioned first image and the ground truth image satisfies a correlation threshold. By "resolve" it is meant that the embodiments attempt to modify, tweak, or otherwise change the images (e.g., by performing any of the style transforms discussed earlier, such as changes in geometry, texture, outline, content, feature point, and/or editing) in an attempt so that the programmatically generated style of the style transitioned images 1580 sufficiently corresponds to the actual style portrayed in the ground truth images 1590. FIG. 15C shows how the embodiments may apply style corrections 1595B in an attempt to correlate the programmatically generated style with the ground truth style.

Returning to FIG. 14, there is an act (act 1430) of training the DNN on the modifying of the attributes and on repeatedly modifying the transitioned first image. FIG. 15C shows how the DNN is able to learn the style corrections 1595C that were performed earlier. In some cases, this learning and modification process may be repeated any number of times, as shown by the repeat label 1595D in FIG. 15C.

Based on these processes, the DNN is able to generate a corpus of training data reflecting the information and processes that were learned. In some cases, training may have occurred earlier, and a corpus of training data may be provided to the DNN to train or further train, tune, or refine the DNN on how to transition images from having the first style to having the second style.

Accordingly, the disclosed embodiments are able to learn the styles of different types of images. By learning these styles, the embodiments are also able to transform the style of one image into another style. By performing these processes, the embodiments are able to reduce the number of cameras mounted on an HMD because images from a single camera can be effectively transformed so their styles match the styles of other types of cameras. In this regard, the embodiments provide substantial benefits to the technical field.

Example Computer Systems

Figure 16:
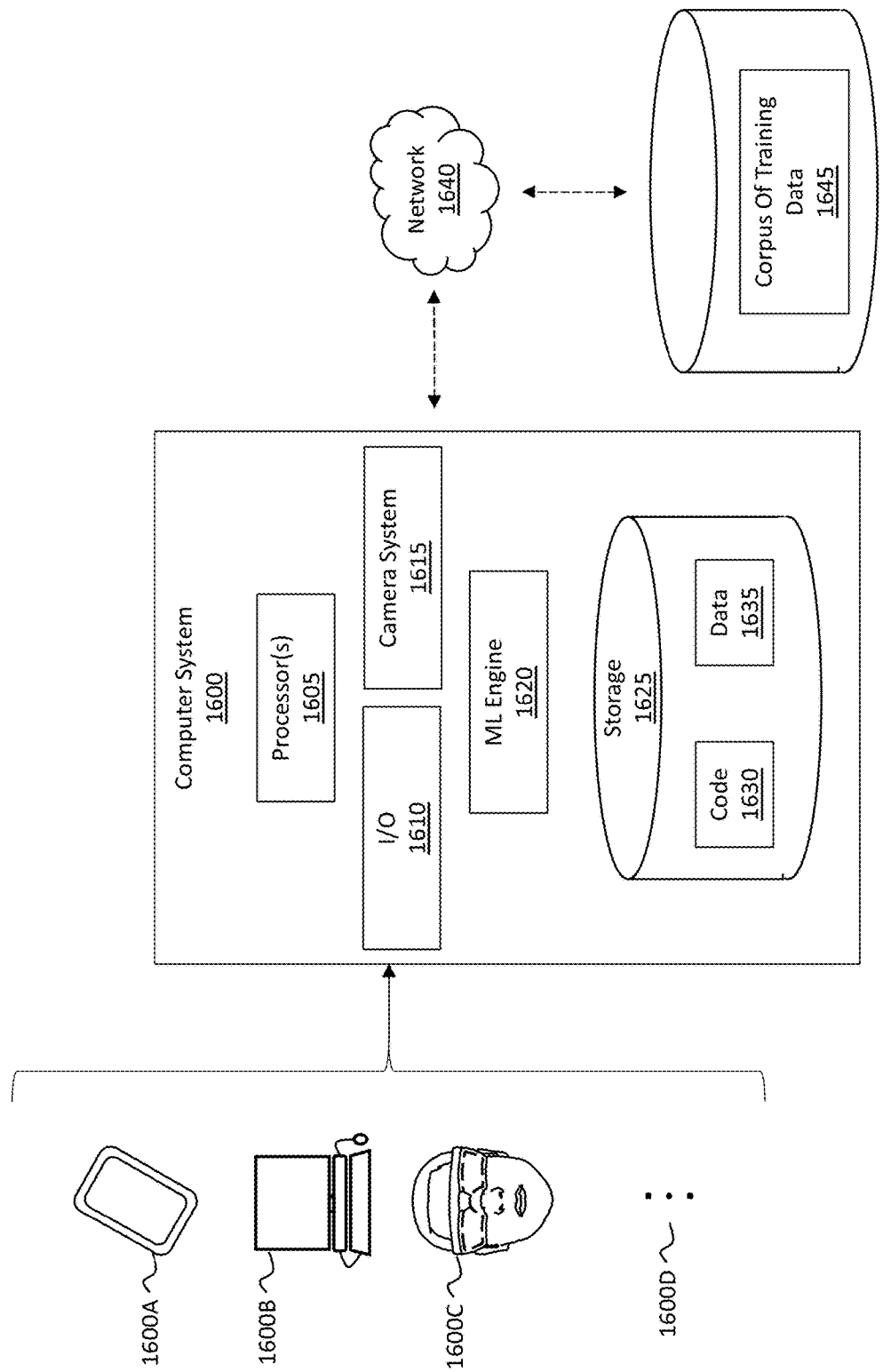
FIG. 16 illustrates an example of a computer system, which may be embodied in the form of an HMD, capable of performing any of the disclosed operations.

Attention will now be directed to FIG. 16 which illustrates an example computer system 1600 that may include and/or be used to perform any of the operations described herein. Computer system 1600 may take various different forms. For example, computer system 1600 may be embodied as a tablet, a desktop, a laptop, a mobile device, a cloud device, an HMD, or a standalone device. Computer system 1600 may also be a distributed system that includes one or more connected computing components/devices that are in communication with computer system 1600. FIG. 16 specifically calls out how computer system 1600 may be embodied as a tablet 1600A, a laptop 1600B, or an HMD 1600C (such as the HMDs discussed herein), but the ellipsis 1600D illustrates how computer system 1600 may be embodied in other forms as well.

In its most basic configuration, computer system 1600 includes various different components. FIG. 16 shows that computer system 1600 includes one or more processor(s) 1605 (aka a "hardware processing unit"), input/output (I/O) 1610, a camera system 1615, a machine learning (ML) engine 1620, and storage 1625.

Regarding the processor(s) 1605, it will be appreciated that the functionality described herein can be performed, at least in part, by one or more hardware logic components (e.g., the processor(s) 1605). That is, any of the disclosed method acts and operations may be performed by the processor(s) 1605. Illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

I/O 1610 includes any type of input or output device. Such devices include, but are not limited to, touch screens, displays, a mouse, a keyboard, HMD displays, and so forth. Any type of input or output device should be included among I/O 1610, without limitation.

Camera system 1615 may include the scanning sensor(s) 105 from FIG. 1 as well as any resources or processes used to process the scanning data. In some cases, camera system 1615 may include any number or type of depth camera or tracking camera. For instance, the cameras can include any type of thermal camera (or thermal imaging sensor), any type of visible light camera, any type of low light camera, and any type of depth detection camera. Similarly, any type of depth detector may be included among the cameras. Examples include, but are not limited to, stereoscopic cameras (both active illumination and passive (i.e. no illumination)), time of flight cameras, range finders, or any other type of range or depth sensor.

Returning to FIG. 16, the ML engine 1620 is configured to perform any of the machine learning or DNN operations disclosed herein. ML engine 1620 may be implemented as a specific processing unit (e.g., a dedicated processing unit as described earlier) configured to perform one or more specialized operations for the computer system 1600. As used herein, the terms "executable module," "executable component," "component," "module," or "engine" can refer to hardware processing units or to software objects, routines, or methods that may be executed on computer system 1600. The different components, modules, engines, and services described herein may be implemented as objects or processors that execute on computer system 1600 (e.g. as separate threads). The ML engine 1620 (or perhaps even just the processor(s) 1605) can be configured to perform any of the disclosed method acts or other functionalities.

Storage 1625 may be physical system memory, which may be volatile, non-volatile, or some combination of the two. The term "memory" may also be used herein to refer to non-volatile mass storage such as physical storage media. If computer system 1600 is distributed, the processing, memory, and/or storage capability may be distributed as well.

Storage 1625 is shown as including executable instructions (i.e. code 1630). The executable instructions (i.e. code 1630) represent instructions that are executable by the processor(s) 1605 of computer system 1600 to perform the disclosed operations, such as those described in the various methods. Storage 1625 is also shown as including data 1635. Data 1635 may include any type of data, including scanning data, pose data, deep neural network (DNN) data, depth maps, images (e.g., visible light images, low light images, thermal images), correspondence mappings, training data, and so forth, without limitation.

The disclosed embodiments may comprise or utilize a special-purpose or general-purpose computer including computer hardware, such as, for example, one or more processors (such as processor(s) 1605) and system memory (such as storage 1625), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RANI, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1600 may also be connected (via a wired or wireless connection) to external sensors (e.g., one or more remote cameras) or devices via a network 1640. For example, computer system 1600 can communicate with any number devices or cloud services to obtain or process data. In some cases, network 1640 may itself be a cloud network. Furthermore, computer system 1600 may also be connected through one or more wired or wireless networks 1640 to remote/separate computer systems(s) that are configured to perform any of the processing described with regard to computer system 1600.

A "network," like network 1640, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1600 will include one or more communication channels that are used to communicate with the network 1640. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

The computer system 1600 may also be configured to access a corpus of training data 1645 that is located externally to the computer system 1600. This corpus may be used to train, further train, tune, or refine the DNN of the computer system 1600 in the manner described earlier.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that are executable by the one or more processors to cause the computer system to at least:
      access a first image generated by a first camera that generates images having a first style such that the first image has the first style;
      access a second image generated by a second camera that generates images having a second style such that the second image has the second style;
      subsequent to a deep neural network (DNN) learning the first style and the second style, feed a copy of the first image as input to the DNN; and
      cause the DNN to modify the first image copy by transitioning the first image copy from being of the first style to subsequently being of the second style such that a modified style of the transitioned first image copy bilaterally matches the second style.

2. The computer system of claim 1, wherein a copy of the second image is also fed as input to the DNN, and wherein the DNN performs at least the following:
   in response to receiving the second image copy and the first image copy as input, identify the second style by analyzing attributes of the second image copy;
   perform one or more of the following:
      identify geometry information based on a perspective captured by the second image copy;

identify outline information based on the perspective captured by the second image copy; or identify texture information by analyzing texture captured by the second image copy; and based on the DNN identifying the second style from the attributes of the second image copy and based on (i) the geometry information, or (ii) the outline information, or (iii) the texture information, modify the first image copy by transitioning the first image copy from being of the first style to subsequently being of the second style such that the modified style of the transitioned first image copy bilaterally matches the second style.

3. The computer system of claim 2, wherein the DNN receives the first image copy of the first style and the second image copy of the second style as input, and wherein the DNN generates two output images, including the transitioned first image copy of the second style and a transitioned second image copy, which is a transitioned version of the second image copy and which is now of the first style.

4. The computer system of claim 1, wherein the first camera is one of a visible light camera, a low light camera, or a thermal imaging camera, and wherein the second camera is a different one of the visible light camera, the low light camera, or the thermal imaging camera.

5. The computer system of claim 1, wherein execution of the computer-executable instructions further causes the computer system to:

feed a copy of the second image as input to the DNN; and cause the DNN to modify the second image copy by transitioning the second image copy from being of the second style to subsequently being of the first style such that a modified style of the transitioned second image copy bilaterally matches the first style.

6. The computer system of claim 5, wherein the first image and the transitioned second image copy constitute a first stereo pair of images of the first style, wherein the second image and the transitioned first image copy constitute a second stereo pair of images of the second style, and wherein execution of the computer-executable instructions further causes the computer system to:

perform parallax correction on the first image and on the transitioned first image copy to align perspectives of the first image and the transitioned first image copy; and perform parallax correction on the second image and on the transitioned second image copy to align perspectives of the second image and the transitioned second image copy.

7. A method performed by a head-mounted device (HMD) to modify a style of an image so the style subsequently corresponds to a different style, said method comprising:

accessing a first image generated by a first camera that generates images having a first style such that the first image is of the first style;

accessing a second image generated by a second camera that generates images having a second style such that the second image is of the second style;

subsequent to a deep neural network (DNN) learning the first style and the second style, feeding a copy of the first image as input to the DNN;

causing the DNN to modify the first image copy by transitioning the first image copy from being of the first style to subsequently being of the second style such that a modified style of the transitioned first image copy bilaterally matches the second style; and displaying one or more portions of the first image or the transitioned first image copy on a display.

8. A method of training a deep neural network (DNN) to recognize styles of images captured by different types of cameras, the method comprising training the DNN by performing at least the following:

accessing a first image of a first style, the first image being generated by a first camera of a first camera type;

accessing a second image of a second style, the second image being generated by a second camera of a second camera type, the second camera being physically aligned with the first camera such that a perspective of the first image substantially corresponds with a perspective of the second image, the second image being a ground truth image;

modifying attributes of the first image to cause the first image to transition from being of the first style to subsequently being of the second style such that a modified style of the transitioned first image bilaterally matches the second style;

comparing the transitioned first image against the ground truth image to identify one or more differences;

repeatedly modifying the transitioned first image in an attempt to resolve the one or more differences until a quality of correlation between the modified transitioned first image and the ground truth image satisfies a correlation threshold; and training the DNN on the modifying of the attributes and on the repeatedly modifying the transitioned first image.

9. The method of claim 8, wherein the first camera is a low light camera and the second camera is a thermal imaging camera.

10. The method of claim 8, wherein a corpus of training data is provided to the DNN to further train the DNN on transitioning images from having the first style to having the second style.

* * * * *